(12) United States Patent
Katsu et al.

(10) Patent No.: US 12,553,763 B2
(45) Date of Patent: Feb. 17, 2026

(54) LIQUID LEVEL DETECTOR

(71) Applicant: Yazaki Corporation, Tokyo (JP)

(72) Inventors: Shota Katsu, Shizuoka (JP); Kenichi Tanaka, Shizuoka (JP); Ryo Hirose, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 350 days.

(21) Appl. No.: 18/520,823

(22) Filed: Nov. 28, 2023

(65) Prior Publication Data

US 2024/0094040 A1 Mar. 21, 2024

Related U.S. Application Data

(63) Continuation of application No. PCT/JP2022/041763, filed on Nov. 9, 2022.

(30) Foreign Application Priority Data

Dec. 9, 2021 (JP) ................. 2021-200124

(51) Int. Cl.
*G01F 23/38* (2006.01)
*B60K 15/03* (2006.01)

(52) U.S. Cl.
CPC .... *G01F 23/38* (2013.01); *B60K 2015/03217* (2013.01)

(58) Field of Classification Search
CPC ............... G01F 23/32–38; B60K 2015/03217
See application file for complete search history.

(56) References Cited

U.S. PATENT DOCUMENTS

| | | | | |
|---|---|---|---|---|
| 1,945,317 | A * | 1/1934 | Kalin | G01F 23/36 200/84 R |
| 7,377,163 | B2 * | 5/2008 | Miyagawa | G01F 23/38 73/317 |
| 10,712,193 | B2 * | 7/2020 | Kato | G01D 11/245 |

(Continued)

FOREIGN PATENT DOCUMENTS

| | | | | |
|---|---|---|---|---|
| JP | 2004340756 | A * | 12/2004 | ............ G01F 23/36 |
| JP | 2012-118044 | A | 6/2012 | |

(Continued)

OTHER PUBLICATIONS

International Search Report for PCT/JP2022/041763 dated Dec. 13, 2022.

*Primary Examiner* — Justin N Olamit
(74) *Attorney, Agent, or Firm* — Sughrue Mion, PLLC

(57) ABSTRACT

A liquid level detector includes: a float; an arm; a holder; a frame having a shaft; a detection part that is provided in the frame and detects a rotation angle of the holder; a ground terminal connected to the detection part; and a conductive part having a first end portion connected to the ground terminal and a second end portion positioned so as to be contactable with respect to the arm, and that is at least partially embedded in the frame, wherein the frame has a pair of first stoppers that come into contact with the distal end side of the arm from a position facing the shaft, thereby restricting a rotation range of the holder, and the second end portion is exposed toward a trajectory of the arm from each of a first stopper surface and a second stopper surface constituting the pair of first stoppers.

6 Claims, 13 Drawing Sheets

(56) References Cited

U.S. PATENT DOCUMENTS

2012/0111108 A1* 5/2012 Hashimoto ........... G01F 23/363
　　　　　　　　　　　　　　　　　　　　　　73/317
2018/0348042 A1　12/2018　Kato et al.

FOREIGN PATENT DOCUMENTS

| JP | 2018-205136 A | 12/2018 |
|----|---------------|---------|
| WO | 2006/076968 A1 | 7/2006 |

* cited by examiner

LIQUID LEVEL DETECTOR

CROSS-REFERENCE TO RELATED APPLICATIONS

The present application is a continuation of International Application No. PCT/JP2022/041763, filed on Nov. 9, 2022, and based upon and claims the benefit of priority from Japanese Patent Application No. 2021-200124, filed on Dec. 9, 2021, the entire contents of which are incorporated herein by reference.

TECHNICAL FIELD

The disclosure relates to a liquid level detector.

BACKGROUND

Conventionally, there is a liquid level detector which detects the liquid level of liquid, based on the displacement of an arm following an up-down movement of a float floating in the liquid. JP2018-205136A discloses a technique of a liquid level detector which is mounted in a fuel tank installed in a vehicle such as an automobile and can detect the liquid level of fuel stored in the fuel tank.

SUMMARY OF THE INVENTION

In the liquid level detector as disclosed in JP2018-205136A, for example, in a case where the device is mounted in a fuel tank of an automobile, static electricity is generated by oscillation of fuel or oscillation of respective resin components due to vibration of the automobile at the time of traveling of the automobile, and the arm is electrically charged. For this reason, depending on various conditions of use, static electricity is expected to move from the arm to a lower potential position, which may result in sparks between the arm and any other part of the liquid level detector through a region exposed in the fuel tank. In the liquid level detector that may be mounted in the fuel tank, the generation of such sparks is undesirable, and in taking measures against the sparks, maintaining a compact profile may be advantageous in terms of workability, or the like.

An object of the present invention is to provide a liquid level detector having a compact outer shape that is capable of suppressing the generation of sparks around the device.

A liquid level detector according to the present invention includes: a float that floats in liquid; an arm that supports the float at a distal end side; a holder that holds a base end side of the arm and converts displacement of the arm following an up-down movement of the float associated with a change in liquid level of the liquid, into a rotational movement; a frame having a shaft as a rotation reference for the holder; a detection part that is provided in the frame and detects a rotation angle of the holder; a ground terminal connected to the detection part; and a conductive part having a first end portion connected to the ground terminal and a second end portion positioned so as to be contactable with respect to the arm, and that is at least partially embedded in the frame, wherein the frame has a pair of first stoppers that come into contact with the distal end side of the arm from a position facing the shaft, thereby restricting a rotation range of the holder, and the second end portion is exposed toward a trajectory of the arm from each of a first stopper surface and a second stopper surface constituting the pair of first stoppers.

A liquid level detector according to the present invention includes: a float that floats in liquid; an arm that supports the float at a distal end side; a holder that holds a base end side of the arm and converts displacement of the arm following an up-down movement of the float associated with a change in liquid level of the liquid, into a rotational movement; a frame having a shaft as a rotation reference for the holder; a detection part that is provided in the frame and detects a rotation angle of the holder; a ground terminal connected to the detection part; and a conductive part having a first end portion connected to the ground terminal and a second end portion positioned so as to be contactable with respect to the arm, and that is at least partially embedded in the frame, wherein the frame has a pair of first stoppers that come into contact with the distal end side of the arm from a position facing the shaft, thereby restricting a rotation range of the holder, and a pair of second stoppers that come into contact with the base end side of the arm from a position facing the shaft, thereby restricting a rotation range of the holder, the rotation range restricted by the pair of second stoppers is greater than the rotation range restricted by the pair of first stoppers, and the second end portion is exposed toward a trajectory of the arm from each of a first auxiliary stopper surface and a second auxiliary stopper surface constituting the pair of second stoppers.

DETAILED DESCRIPTION OF THE INVENTION

A liquid level detector according to each embodiment will be described in detail below with reference to the drawings.

First Embodiment

Figure 1:
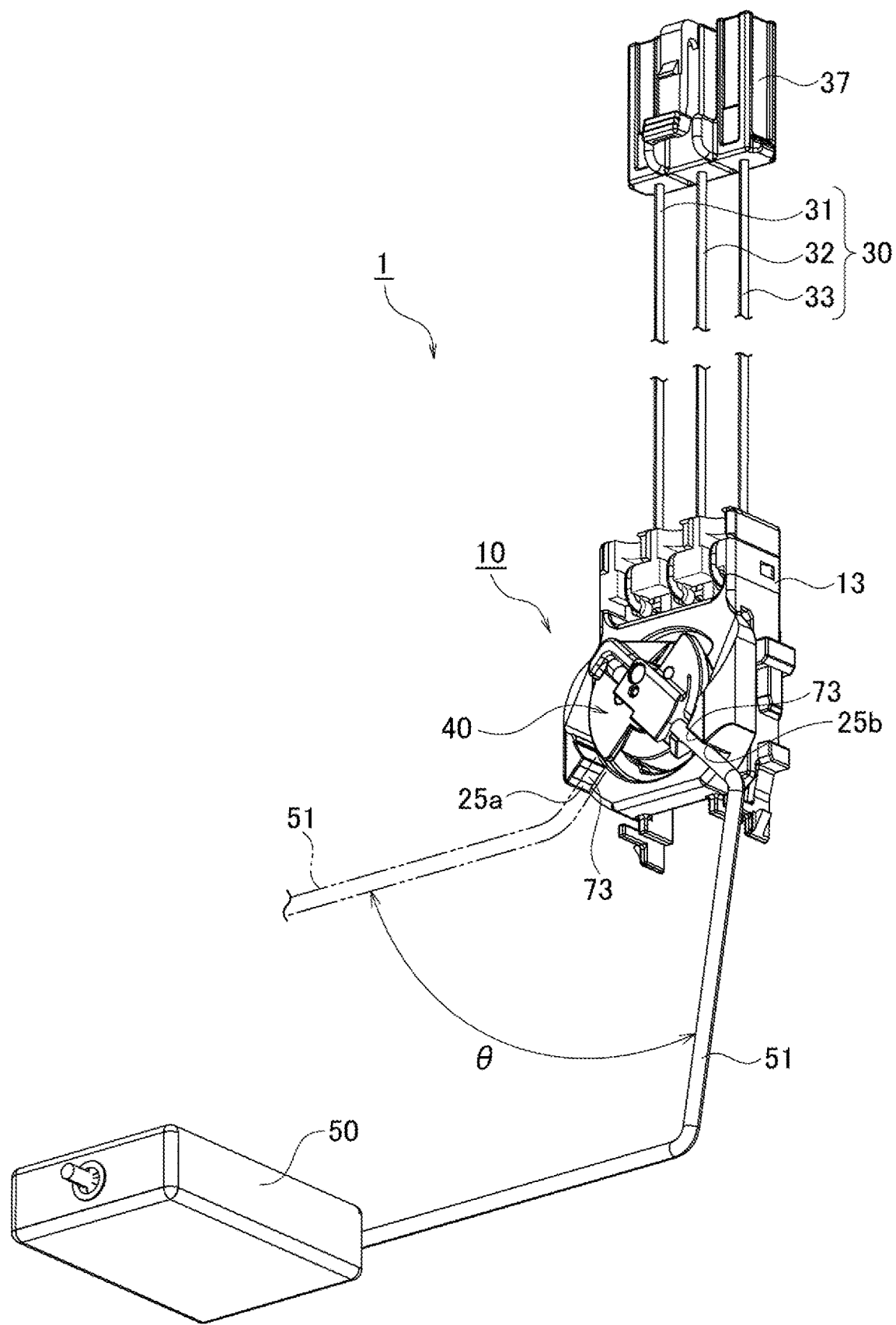
FIG. 1 is a perspective view of a liquid level detector according to a first embodiment.
Figure 2:
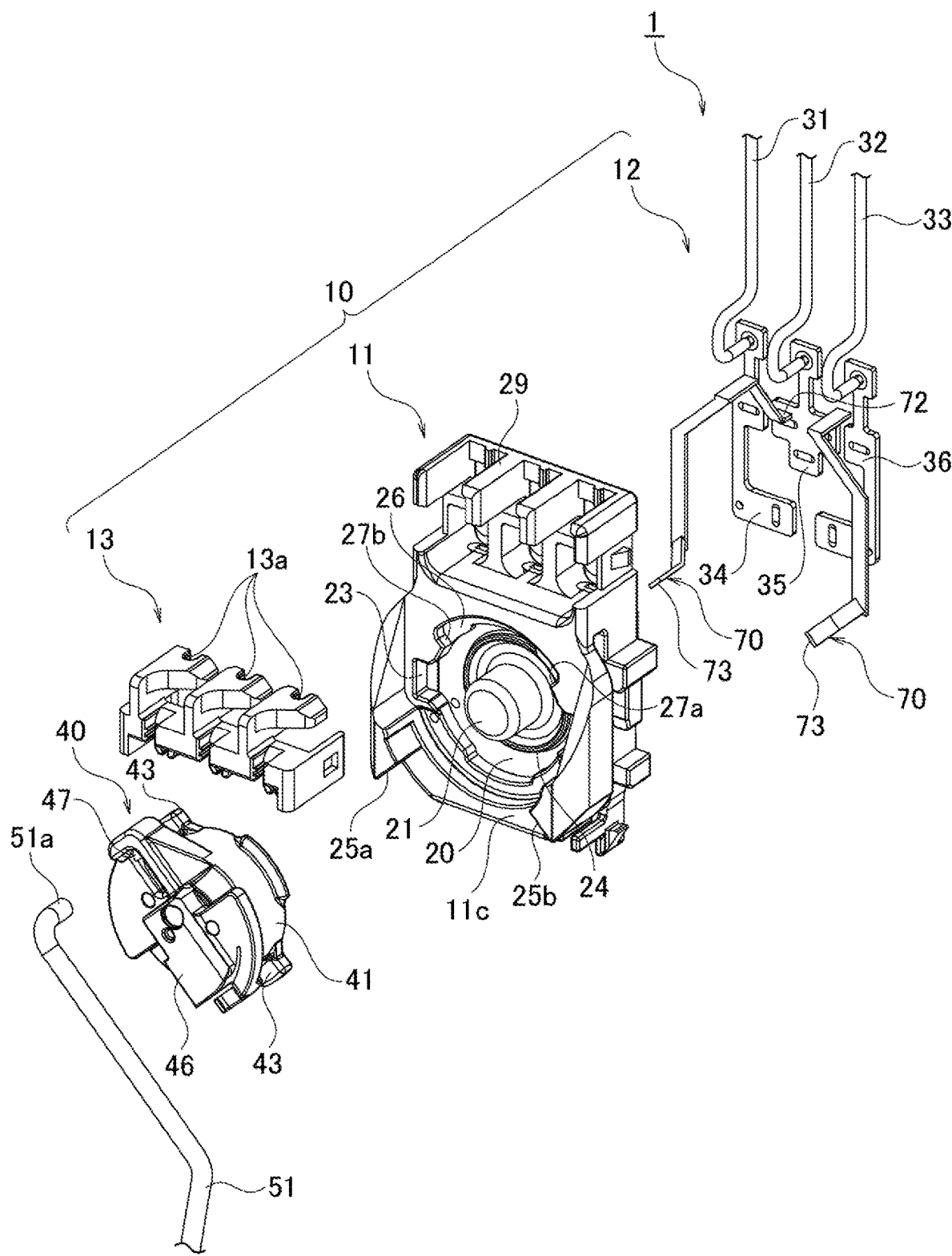
FIG. 2 is an exploded perspective view of a main portion of the liquid level detector according to the first embodiment.
Figure 3:
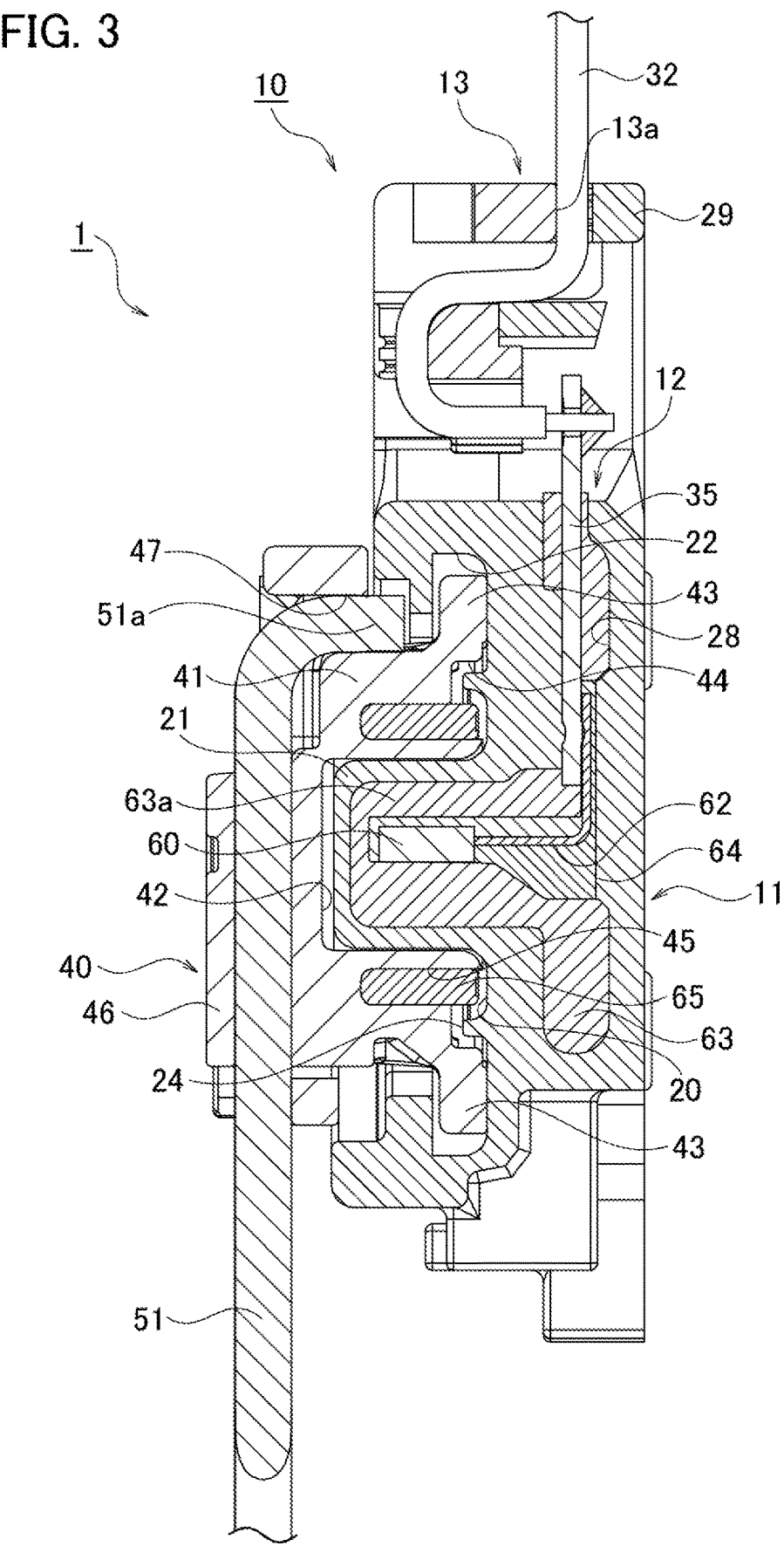
FIG. 3 is a cross-sectional view of the main portion of the liquid level detector according to the first embodiment.

FIG. 1 is a perspective view of a liquid level detector 1 according to a first embodiment. FIG. 2 is an exploded perspective view of a main portion of the liquid level detector 1. FIG. 3 is a cross-sectional view of the main portion of the liquid level detector 1, which is cut in a plane extending along a vertical direction while including a central axis of a shaft 21. Hereinafter, the term "up-down" in the liquid level detector 1 means an upper side or a lower side in the vertical direction.

The liquid level detector 1 detects the liquid level in liquid (liquid level position), based on the displacement of an arm 51 following the up-down movement of a float 50 floating in the liquid. Hereinafter, as an example, the liquid level detector 1 is mounted in a fuel tank installed in a vehicle such as an automobile, and detects the liquid level of fuel stored in the fuel tank. The liquid level detector 1 includes a device body 10, lead wires 30, a connector 37, a holder 40, a float 50, and the arm 51.

The device body 10 is a body part of the liquid level detector 1. The device body 10 includes a frame 11, a lead frame 12, and a holding member 13. Hereinafter, the term "front-rear" in the device body 10 means a front side or a rear side in the horizontal direction. In this case, the front side is the side in which the holder 40 is supported in the device body 10, and the rear side is the side in which the lead frame 12 and the like are insert-molded.

The frame 11 is a structure made of resin, for example, and supports the holder 40 rotatably. The frame 11 has a rotation recess 20, the shaft 21, a locking groove 22, a pair of insertion holes 23, a guide protrusion 24, a first stopper surface 25a, and a second stopper surface 25b.

The rotation recess 20 is provided in a circular shape in a plan view at the front side of the frame 11, and rotatably accommodates a portion of the holder 40. The shaft 21 is a rotation reference for the holder 40 that is coaxially provided at the center of the rotation recess 20, and is engaged with a shaft recess 42 formed in the holder 40.

The locking groove 22 is provided in the inner peripheral portion of the rotation recess 20 in the circumferential direction, and locks flanges 43 of the holder 40 rotatably. The pair of insertion holes 23 are provided at positions facing each other in the horizontal direction at the edge of the rotation recess 20, and communicate with the locking groove 22. The guide protrusion 24 is provided at the bottom of the rotation recess 20 so as to surround the periphery of the shaft 21, and guides the rotation of the holder 40.

The first stopper surface 25a and the second stopper surface 25b are a pair of first stoppers that restrict the arm 51 from oscillating by coming into contact with the arm 51, thereby restricting the rotation of the holder 40. The pair of first stoppers are provided at the front side of the frame 11 and below the center of the rotation recess 20, and face each other along the outer periphery of the rotation recess 20 at a distance from each other. When the holder 40 rotates, the arm 51 comes into contact with one of the pair of first stoppers at the distal end side from the position facing the shaft 21. As a result, the rotation range of the holder 40 is restricted to an angular range θ. The first stopper surface 25a comes into contact with the arm 51 at the maximum detection position of the liquid level among the liquid levels that can be detected by the liquid level detector 1. That is, the first stopper surface 25a is at the position where the arm 51 comes into contact when the remaining capacity of the fuel in the fuel tank is almost full. The second stopper surface 25b comes into contact with the arm 51 at the minimum detection position of the liquid level among the liquid levels that can be detected by the liquid level detector 1. That is, the second stopper surface 25b is at the position where the arm 51 comes into contact when the remaining capacity of the fuel in the fuel tank is almost empty.

The frame 11 may also have a rotation groove 26, a first auxiliary stopper surface 27a, and a second auxiliary stopper surface 27b. The rotation groove 26 is provided at the upper edge of the rotation recess 20 between the two insertion holes 23, and becomes the trajectory of a locking end 51a of the arm 51 when the holder 40 rotates.

The first auxiliary stopper surface 27a and the second auxiliary stopper surface 27b are a pair of second stoppers that that restrict the arm 51 from oscillating by coming into contact with the locking end 51a of the arm 51, thereby restricting the rotation of the holder 40. The pair of second stoppers are provided at both ends of the rotation groove 26 and face each other along the edge of the rotation recess 20 at a distance from each other. For this reason, when the holder 40 rotates, the arm 51 comes into contact with one of the pair of second stoppers at the locking end 51a that is positioned at the base end side from the position facing the shaft 21. Here, a rotation range of the holder 40 restricted by the pair of second stoppers may be set to a rotation angle greater than the angular range θ restricted by the pair of first stoppers. The first auxiliary stopper surface 27a is at a position where the locking end 51a of the arm 51 comes into contact when the remaining capacity of the fuel in the fuel tank is almost full. The second auxiliary stopper surface 27b is at a position where the locking end 51a of the arm 51 comes into contact when the remaining capacity of the fuel in the fuel tank is almost empty. When an overload is applied to the arm 51, the arm 51 bends by coming into contact with one of the pair of first stoppers due to a large load, and the locking end 51a of the arm 51 also comes into contact with one of the pair of second stoppers. As a result, the overload acting on the arm 51 can be applied not only to the first stopper, but also to the second stopper, thereby making it possible to disperse the overload.

Further, the frame 11 has an insert molding part 28 and a lead wire arrangement part 29. The insert molding part 28 is a region in which a portion of the lead frame 12, a Hall element 60, a portion of the conductive part 70, and the like are insert-molded into the frame 11. In the lead wire arrangement part 29, a portion of the lead frame 12 which is connected to the lead wires 30 is exposed to the outer side of the frame 11, and the distal end portions of the lead wires 30 to be connected to the lead frame 12 are arranged.

The lead frame 12 is a conductor part that is partially insert-molded into the frame 11. The lead frame 12 includes a plurality of terminals each of which is an independent plate body according to the type of the lead wire 30 which is based on the detection method for a detection part. In the present embodiment, the lead frame 12 includes an input terminal 34, a ground (GND) terminal 35, and an output terminal 36. A lead 62 extending from the Hall element 60 is electrically connected to the input terminal 34, the ground terminal 35, and the output terminal 36 according to their respective functions.

The holding member 13 is attached to the lead wire arrangement part 29 provided in the frame 11 to hold the lead wires 30. For example, the holding member 13 may have grooves 13a corresponding to the diameter of the lead wires 30, for each lead wire 30. In the holding member 13, the lead wires 30 are held in the lead wire arrangement part 29 in a state where the lead wires 30 are engaged with the grooves 13a, and thus the lead wires 30 can hardly be detached from the lead frame 12.

In addition, the device body 10 includes the Hall element 60 serving as the detection part for detecting the rotation angle of the holder 40, and the lead 62.

The Hall element 60 is a magnetic detection element that is embedded in the shaft 21 of the frame 11 and generates a Hall voltage proportional to a magnetic flux density passing through the Hall element 60 when a magnetic field is applied from the outside in a state in which a voltage is applied. Meanwhile, a magnet 65 which will be described later is provided at the inner side of the holder 40. When the holder 40 rotates due to a change in the liquid level, the magnet 65 also rotates and is displaced, and an intersection angle between the Hall element 60 and the magnetic flux of the magnet 65 changes, and thus the Hall voltage changes. That is, the rotation angle of the holder 40 can be detected based on the measured Hall voltage, thereby making it possible to detect the liquid level of the fuel. As described above, the lead 62 extends from the Hall element 60 and is electrically connected to the terminals included in the lead frame 12.

In addition, the Hall element 60, the lead 62, and a portion of the lead frame 12 may be mounted at the inner side of the frame 11 by performing insert molding several times. For example, the Hall element 60 and the lead 62 may be mounted in the frame 11 together with a resin body 63 by performing insert molding in the first step. Thereafter, the lead frame 12 may be mounted in the frame 11 by performing insert molding in the second step. The resin body 63 has an inner shaft 63a coaxially embedded at the inner side of the shaft 21 of the frame 11. The Hall element 60 is further provided at the inner side of the inner shaft 63a. The Hall element 60 and the lead 62 may be pre-embedded in the resin body 63, using a resin member 64. Although not illustrated, the resin member 64 may include other electronic components related to the operation of the Hall element 60.

Further, the device body 10 includes the conductive parts 70 which are at least partially embedded in the frame 11. The conductive parts 70 will be described in detail below.

A plurality of lead wires 30 are provided based on the detection method or the like for the detection part, and electrically connect the liquid level detector 1 with an external device such as a measurement instrument. In the present embodiment, the lead wires 30 include an input wire 31 for power sources, a ground (GND) wire 32, and an output wire 33 for signals, which are independent of each other. One end of the input wire 31 is connected to the input terminal 34 in the lead wire arrangement part 29. One end of the ground wire 32 is connected to the ground terminal 35 in the lead wire arrangement part 29. One end of the output wire 33 is connected to the output terminal 36 in the lead wire arrangement part 29.

The connector 37 connects the other ends of the input wire 31, the ground wire 32 and the output wire 33 without being in contact with each other, and is connected to the connector which is electrically continuous with the external device.

The holder 40 is a member made of resin, for example, and holds the base end side of the arm 51, and converts the displacement of the arm 51 following the up-down movement of the float 50 associated with the change of the fuel level, into a rotational movement. Hereinafter, the term "front-rear" in the holder 40 means a front side or a rear side in the horizontal direction. At this time, the front side is the side in which the arm 51 is held, and the rear side is the side supported by the device body 10 in the holder 40. The holder 40 has a holder body 41 and an arm holding part 46.

The holder body 41 is a cylindrical member having the shaft recess 42, a pair of flanges 43, and a guide recess 44.

The shaft recess 42 is provided at the rear surface side of the holder body 41 and provided coaxially with the center shaft of the shaft 21, and is rotatably and slidably engaged with the shaft 21, using the shaft 21 provided in the frame 11 as a rotary shaft. In the present embodiment, the center shaft of the shaft recess 42 is referred to as a "rotary shaft" in distinction from the center shaft of the shaft 21. Each of the flanges 43 is provided so as to protrude radially outward from the rear edge of the holder body 41. The pair of flanges 43 protrude in respective opposite directions along the extension direction of the arm 51 produced when the arm is held by the arm holding part 46. The guide recess 44 is provided at the rear surface side of the holder body 41 and at the outer peripheral side of the magnet 65 provided in the holder body 41, and accommodates the guide protrusion 24 provided in the frame 11.

When the holder 40 is attached to the frame 11, an operator fits the holder 40 into the rotation recess 20 in a state in which the pair of flanges 43 are provided so as to match the position of the pair of insertion holes 23 in the frame 11. When the flanges 43 pass through the insertion holes 23, the shaft 21 of the frame 11 is inserted into the shaft recess 42 of the holder 40. In addition, the guide protrusion 24 of the frame 11 enters the guide recess 44 of the holder 40. Next, when the operator rotates the holder 40 fitted into the rotation recess 20 such that a locking hole 47 described later is arranged upward, the flanges 43 enter the locking groove 22 of the frame 11, thereby allowing the holder 40 not to remove from the rotation recess 20. In the state where the holder 40 holds the arm 51, the rotation range of the holder 40 is restricted by the first stopper or the like, thereby preventing the holder 40 removing from the rotation recess 20 due to the movement of the flanges 43 to the position of the insertion holes 23.

The arm holding part 46 holds the arm 51 such that the extension direction of the arm 51 is perpendicular to the rotation axis of the holder 40. The arm holding part 46 has the locking hole 47. The locking hole 47 is provided at a portion of the peripheral edge of the holder body 41 so as to penetrate in the front-rear direction of the holder 40, and locks the locking end 51a positioned at the base end side of the arm 51.

The holder 40 is also provided with the annular magnet 65. The magnet 65 is provided at the inner side of the holder body 41 so as to be arranged at the inner peripheral side of the shaft recess 42, and is a displacement member used for detecting the rotation angle of the holder 40 by means of the Hall element 60. In this case, the Hall element 60 is positioned at the inner diameter side of the magnet 65 which rotates and is displaced, associated with the rotation of the holder 40.

The float 50 floats on a liquid fuel. That is, the float 50 moves up and down as the liquid level of the fuel changes in the fuel tank.

The arm 51 is a rod-shaped member which connects the holder 40 and the float 50 with each other. The arm 51 supports the float 50 at the distal end side. Meanwhile, the arm 51 is held by the arm holding part 46 of the holder 40 at the base end side of the arm 51 opposite to the distal end side. The arm 51 may have one or more bending parts. The end portion at the base end side of the arm 51 is a locking end 51*a* bent at a right angle. The locking end 51*a* is inserted into the locking hole 47 when the arm holding part 46 holds the arm 51. The locking end 51*a* inserted into the locking hole 47 is arranged in the rotation groove 26 provided in the frame 11.

Figure 4:
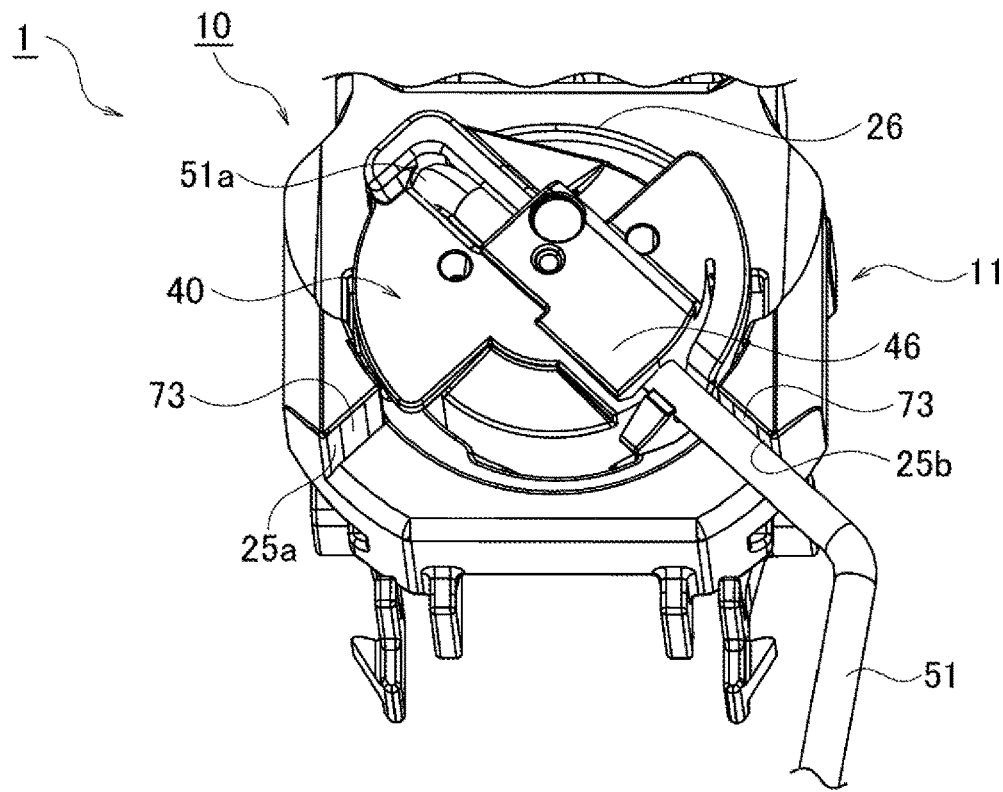
FIG. 4 is a perspective view of the main portion of the liquid level detector in which a device body and the like are viewed from diagonally downward in front.
Figure 5:
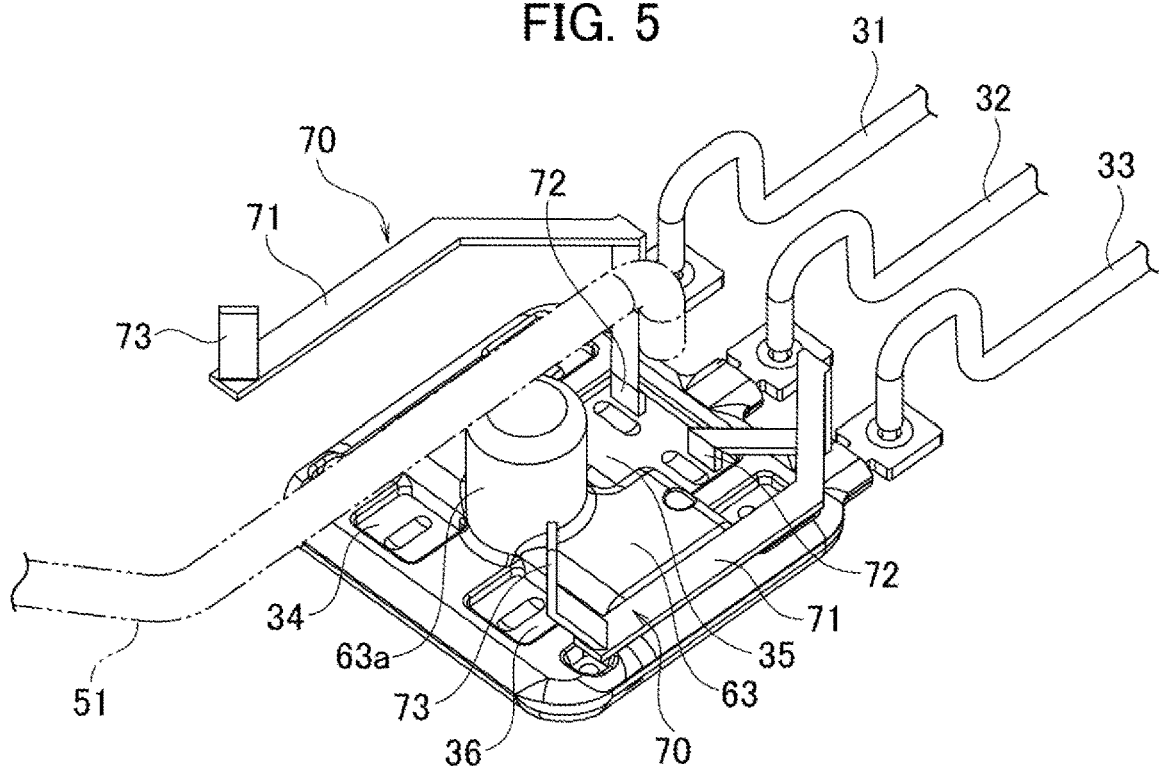
FIG. 5 is a perspective view illustrating conductive parts exemplifying an arm at an intermediate detection position of liquid level.
Figure 6:
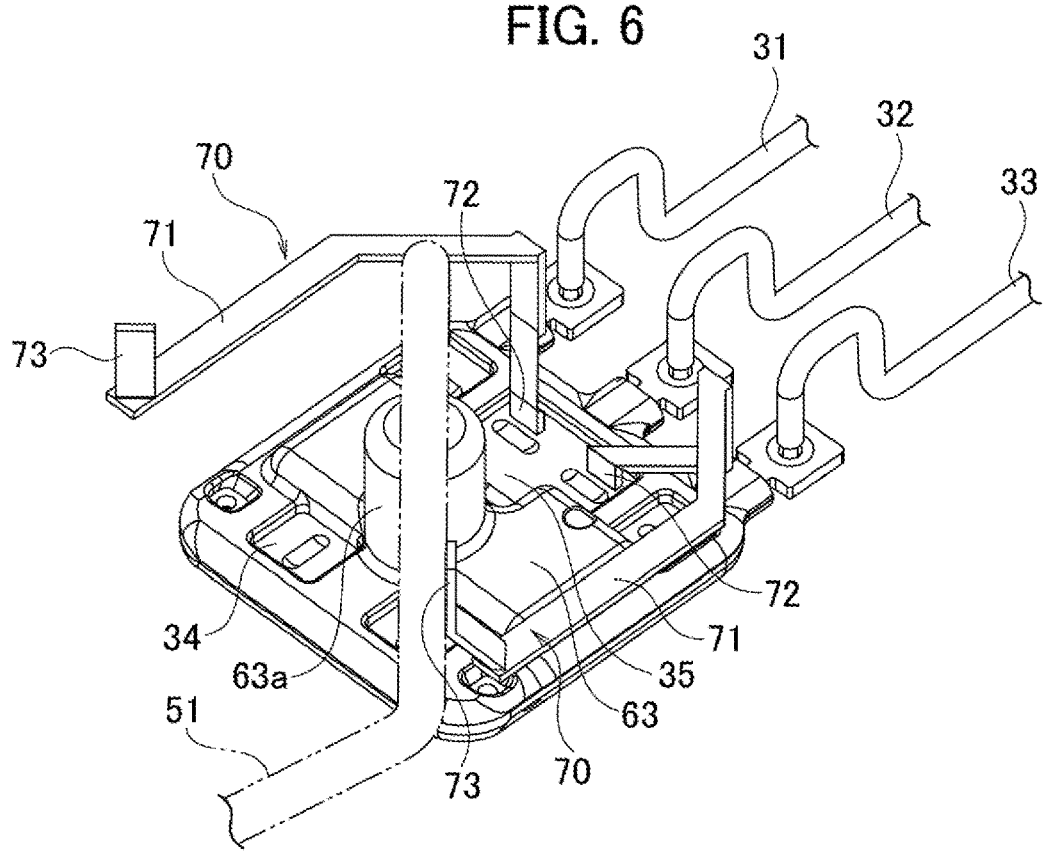
FIG. 6 is a perspective view illustrating the conductive parts exemplifying the arm at a minimum detection position of the liquid level.

Next, the conductive part 70 will be described in detail. FIG. 4 is a perspective view of the main portion of the liquid level detector 1 in which the device body 10 and the holder 40 are viewed from diagonally downward in front. FIG. 4 illustrates a state in which the arm 51 is in contact with the second stopper surface 25*b* of the frame 11. FIG. 5 is a perspective view illustrating the conductive parts 70 exemplifying the arm 51 at the intermediate detection position of the liquid level, excluding the frame 11 from the device body 10. FIG. 6 is a perspective view illustrating the conductive parts 70 exemplifying the arm 51 at the minimum detection position of the liquid level, which corresponds to FIG. 5. In FIGS. 5 and 6, the arm 51 is drawn with two-dot chain lines while assuming that it is held by the holder 40.

The conductive part 70 is a conductive member having an extension portion 71, a first end portion 72, and a second end portion 73. The extension portion 71 is a body of the conductive part 70. The first end portion 72 is one end portion of the extension portion 71, and is connected to the ground terminal 35 included in the lead frame 12. The second end portion 73 is the other end portion of the extension portion 71, and is positioned so as to be contactable with respect to the arm 51. In the conductive part 70, all of the extension portion 71, the first end portion 72 and the second end portion 73 are formed of, for example, a plate material made of metal.

Here, the Hall element 60 and the lead frame 12 can be mounted at the inner side of the frame 11 by performing insert molding several times. Thus, the conductive parts 70 can also be mounted at the inner side of the frame 11 by performing insert molding. In this case, the first end portion 72 may be joined to the ground terminal 35 in advance by welding or the like before performing insert molding.

In the present embodiment, there are two conductive parts 70 having symmetrical shapes with each other. As illustrated in FIG. 4, the second end portion 73 of one conductive part 70 is exposed from the first stopper surface 25*a* of the pair of first stoppers toward the trajectory of the arm 51. Further, as illustrated in FIG. 4, the second end portion 73 of the other conductive part 70 is exposed from the second stopper surface 25*b* of the pair of first stoppers toward the trajectory of the arm 51. Each of the extension portions 71 is embedded in the frame 11 so as to extend from the first end portion 72 to the second end portion 73 in a route that does not interfere with other components and is not exposed to the outer side of the frame 11. That is, the shape of the extension portions 71 is determined based on the internal structure or shape of the frame 11.

In the conductive parts 70 described above, as illustrated in FIG. 5, the arm 51 does not come into contact with either the second end portion 73 exposed from the first stopper surface 25*a* or the second end portion 73 exposed from the second stopper surface 25*b* when the fuel liquid surface is positioned at the intermediate detection position. Here, the intermediate detection position of the liquid level refers to a position that is approximately the intermediate liquid level among the liquid levels that can be detected by the liquid level detector 1. The intermediate liquid level corresponds, for example, to the liquid level indicated in a case where the remaining capacity of the fuel in the fuel tank is approximately half of that when the tank is full. Note that when the detection position of the liquid level is positioned at the intermediate detection position and not poisoned at the maximum detection position or the minimum detection position, the arm 51 does not come into contact with any of the second end portions 73.

Meanwhile, as illustrated in FIG. 6, when the liquid level of the fuel is positioned at the minimum detection position, the arm 51 comes into contact with the second end portion 73 exposed from the second stopper surface 25*b*. Similarly, when the liquid level of the fuel is positioned at the maximum detection position (not illustrated), the arm 51 comes into contact with the second end portion 73 exposed from the first stopper surface 25*a*.

Next, the operation of the liquid level detector 1 will be described below.

First, in the liquid level detector 1, as a basic operation, the arm 51 oscillates following the up-down movement of the float 50 associated with the change in the liquid level of the fuel, and the holder 40 which is connected to the arm 51 rotates with respect to the device body 10. The Hall element 60 in the device body 10 detects a change in the magnetic flux of the magnet 65 in the holder 40, and the detection result is transmitted to a measurement unit or the like as an external device through the output wire 33. For example, the measurement unit measures the liquid level on the basis of the output signals transmitted from the liquid level detector 1, and if necessary, warns of fuel exhaustion or the like in the fuel tank.

Here, when the liquid level detector 1 is mounted in the fuel tank of an automobile, static electricity may be generated by oscillation of fuel or oscillation of respective resin components due to vibration at the time of traveling of the automobile, and the arm 51 may be electrically charged. In contrast, when the remaining capacity of the fuel is full or empty, or in a case where the oscillation width of the arm 51 becomes large due to large vibration at the time of traveling of the automobile even when the remaining capacity of the fuel is not full or not empty, the arm 51 comes into contact with one of the pair of first stoppers. That is, the arm 51 comes into contact with the second end portion 73 of the conductive part 70 that is exposed from the first stopper surface 25*a* or the second stopper surface 25*b*. Since the conductive part 70 is connected to the ground terminal 35 through the first end portion 72, the static electricity remaining in the arm 51 is discharged to the ground wire 32 through the conductive part 70 because the arm 51 comes into contact with the second end portion 73.

Next, the effect of the liquid level detector 1 will be described.

The liquid level detector 1 includes the float 50 that floats in liquid, the arm 51 that supports the float 50 at the distal end side, and the holder 40 that holds the base end side of the arm 51 and converts the displacement of the arm 51 following the up-down movement of the float 50 associated with a change in the liquid level of the liquid, into a rotational movement. Further, the liquid level detector 1 includes the frame 11 having the shaft 21 as a rotation reference for the holder 40, a detection part that is provided in the frame 11 and detects the rotation angle of the holder 40, and a ground terminal 35 connected to the detection part. In addition, the liquid level detector 1 includes the conductive part 70 having the first end portion 72 connected to the ground terminal 35 and the second end portion 73 positioned so as to be contactable with respect to the arm 51, and that is at least partially embedded in the frame 11.

In the above example, the detection part corresponds to the Hall element 60. However, the detection method employed by the liquid level detector 1 is not limited to the method using the Hall element 60, and other detection methods may be employed as long as the method can detect the rotation angle of the holder 40.

In the liquid level detector 1, the frame 11 may have a pair of first stoppers that come into contact with the distal end side of the arm 51 from the position facing the shaft 21, thereby restricting the rotation range of the holder 40. In this case, the second end portion 73 may be exposed toward the trajectory of the arm 51 from each of the first stopper surface 25a and the second stopper surface 25b constituting the pair of first stoppers.

According to the liquid level detector 1, the conductive part 70 has the first end portion 72 connected to the ground terminal 35, and the second end portion 73 positioned so as to be contactable with respect to the arm 51. For this reason, even when the arm 51 is electrically charged, when the arm 51 comes into contact with the second end portion 73, static electricity remaining in the arm 51 can be discharged to the ground wire 32 through the conductive part 70. Accordingly, it is possible to suppress in advance the generation of sparks around the liquid level detector 1, which is caused by the arm 51 that is electrically charged and the resulting attempt of static electricity to move from the arm 51 to a lower potential place.

According to the liquid level detector 1, the conductive part 70 is at least partially embedded in the frame 11. For this reason, even if the liquid level detector 1 is provided with the conductive part 70, there is no significant difference in the external shape compared with the case where the conductive part 70 is not provided. Accordingly, for example, when an operator mounts the liquid level detector 1 in the fuel tank, the workability for mounting the liquid level detector 1 is not degraded due to the increase in size and complexity of the liquid level detector 1.

Further, by exposing the second end portion 73 of the conductive part 70 from the first stopper surface 25a or the like toward the trajectory of the arm 51, the effect described above can be realized with a simple structure. In addition, even regarding the outer shape of the liquid level detector 1, the position or structure of the first stopper surface 25a or the like in the frame 11 is equivalent to that of an existing liquid level detector. For this reason, even when the conductive part 70 is newly provided in the frame 11, the outer shape of the frame 11 need not be substantially changed from the existing one. Furthermore, the second end portion 73 is provided so as to match the position of the first stopper surface 25a or the like, and thus the conductive parts 70 do not prevent the arm 51 from oscillating. For this reason, the presence of the conductive parts 70 does not affect the detection result of the liquid level detector 1.

As described above, the present embodiment makes it possible to provide the liquid level detector 1 having a compact outer shape that is capable of suppressing the generation of sparks around the device 1.

In the liquid level detector 1, the conductive part 70 may be a conductive plate material.

According to the liquid level detector 1, the conductive part 70 can be easily formed in terms of ease of machining. Further, when the conductive part 70 is embedded in the frame 11 by performing insert molding, it is easy to maintain the conductive part 70 in a desired shape in advance, and thus it is advantageous in terms of improving the efficiency of workability during insert molding.

In the liquid level detector 1, the frame 11 may have a pair of first stoppers that come into contact with the distal end side of the arm 51 from the position facing the shaft 21, thereby restricting the rotation range of the holder 40. The frame 11 may also have a pair of second stoppers that come into contact with the base end side of the arm 51 from the position facing the shaft 21, thereby restricting the rotation range of the holder 40. The rotation range restricted by the pair of second stoppers is greater than the rotation range restricted by the pair of first stoppers. In this case, the second end portion 73 may be exposed toward the trajectory of the arm 51 from each of the first auxiliary stopper surface 27a and the second auxiliary stopper surface 27b constituting the pair of second stoppers.

In the above description, a case has been described as an example in which the second end portions 73 of the conductive parts 70 are provided so as to match the positon of the first stopper surface 25a and the second stopper surface 25b, which are the pair of first stoppers. In contrast, in addition to the pair of first stoppers, the liquid level detector 1 has a pair of second stoppers including the first auxiliary stopper surface 27a and the second auxiliary stopper surface 27b, with which the locking end 51a of the arm 51 can come into contact, as described above. Thus, instead of the first stopper surface 25a and the second stopper surface 25b, the second end portions of the conductive part may be provided so as to match the positon of the first auxiliary stopper surface 27a and the second auxiliary stopper surface 27b.

Figure 7:
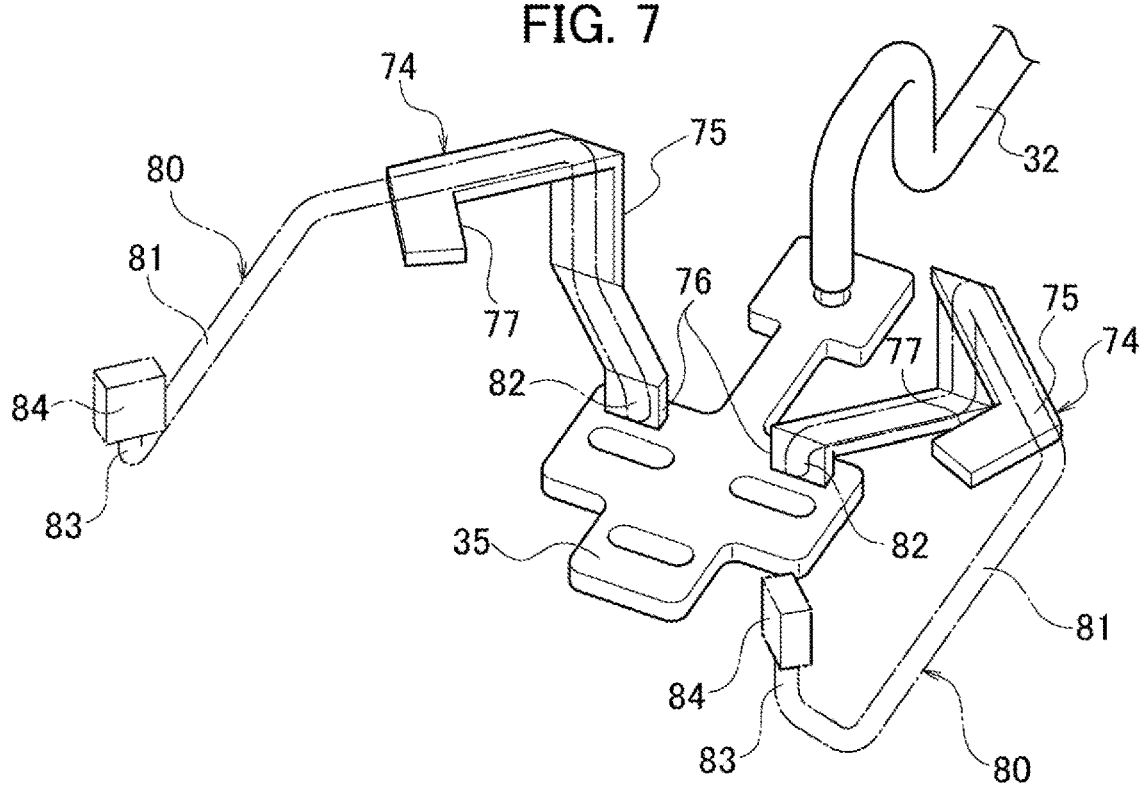
FIG. 7 is a perspective view illustrating another example of conductive parts that may be employed by the liquid level detector.

FIG. 7 is a perspective view illustrating conductive parts 74 and conductive parts 80 as two other examples of the conductive parts that can be employed by the liquid level detector 1, which corresponds to FIG. 5. In order to distinguish the conductive parts 74 from the conductive parts 80, the conductive parts 80 are drawn as two-dot chain lines. The configuration other than the conductive parts 74 and the conductive parts 80 is the same as the configuration illustrated in FIG. 5, and the description thereof will be omitted.

Similar to the conductive part 70, the conductive part 74 is a conductive member having an extension portion 75, a first end portion 76, and a second end portion 77. However, the second end portion 77 is exposed from the first auxiliary stopper surface 27a and the second auxiliary stopper surface 27b toward the trajectory of the locking end 51a of the arm 51. According to the exposed position of the second end portion 77, for example, the extension portion 75 may be shorter than the extension portion 71 of the conductive part 70. Since the locking end 51a comes into contact with the first auxiliary stopper surface 27a or the second auxiliary stopper surface 27b when an overload is applied to the arm 51, the contact frequency is less than when the second end portion 73 of the conductive part 70 comes into contact with one of the pair of first stoppers. However, the opportunity for the locking end 51a to comes into contact with one of the second end portions 77 provided in the pair of second stoppers is secured, and thus the liquid level detector 1 having a compact outer shape can also suppress the generation of sparks around the device 1.

Meanwhile, the conductive part 80 can replace the conductive part 70 or the conductive part 74 described above, and is a conductive structure having an extension portion 81, a first end portion 82, and a second end portion. For example, the extension portion 81 is metal wiring. Here, one end of the extension portion 81 connected to the ground terminal 35 is the first end portion 82, which is the same as that of the conductive part 70. In contrast, the second end portion of the conductive part 80 is not the same as the other end of the extension portion 81, but a portion of the block body 84 which is connected to the other end 83 of the extension portion 81. The block body 84 is a conductive member.

Even in this case, there are two conductive parts 80 which are symmetrical to each other. A portion of the block body 84 of one conductive part 80 may be exposed from the first stopper surface 25a of the pair of first stoppers toward the trajectory of the arm 51. A portion of the block body 84 of the other conductive part 80 may be exposed from the second stopper surface 25b of the pair of first stoppers toward the trajectory of the arm 51. Further, a portion of the block body 84 may be exposed from the first auxiliary stopper surface 27a and the second auxiliary stopper surface 27b constituting the pair of second stoppers in the same manner as the conductive part 74.

Thus, in the liquid level detector 1, the conductive part 80 may be a combination of a conductive member including the second end portion and wiring.

According to the liquid level detector 1 described above, even if the conductive part 70 is not necessarily formed of a plate material, it is possible to provide the liquid level detector 1 with a simple configuration that is capable of suppressing the generation of sparks around the device 1.

Figure 8:
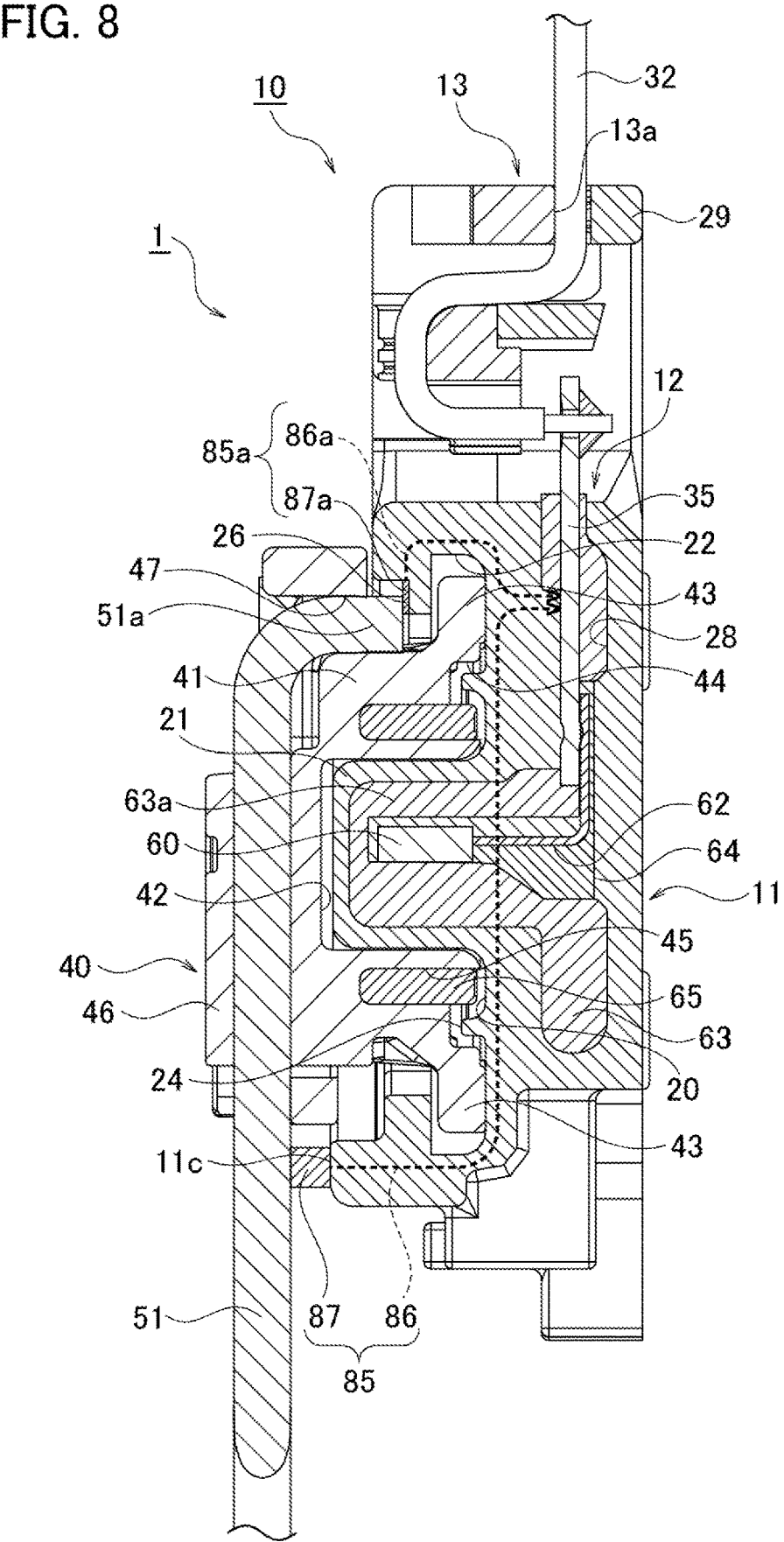
FIG. 8 is a cross-sectional view illustrating another example of conductive parts that may be employed by the liquid level detector.

FIG. 8 is a schematic cross-sectional view illustrating a conductive part 85 and a conductive part 85a as two other examples of the conductive part which can be employed by the liquid level detector 1, which corresponds to FIG. 3. The configuration other than the conductive part 85 and the conductive part 85a is the same as the configuration illustrated in FIG. 3, and the description thereof will be omitted.

The conductive part 85 can replace the conductive part 70 described above, and is a conductive structure having an extension portion 86, a first end portion, and a second end portion. The extension portion 86 may be a plate material made of metal, or metal wiring. In FIG. 8, the extension portion 86 and the first end portion are illustrated schematically using the dashed lines. The route adopted by the extension portion 86 at the inner side of the frame 11 may be set in various ways, for example, under the condition that it does not interfere with other components and is not exposed to the outer side of the frame 11.

The second end portion of the conductive part 85 may be a protrusion 87 protruding from the frame 11 toward the trajectory of the arm 51 so as to come into contact with the arm 51 at an intermediate detection position of the liquid level. In this case, the protrusion 87 may be provided on an arm-facing part 11c as a plane exposed between the first stopper surface 25a and the second stopper surface 25b toward the trajectory of the arm 51.

Meanwhile, the conductive part 85a can replace the conductive part 85 described above, and is a conductive structure having an extension portion 86a, a first end portion, and a second end portion. The extension portion 86a is equivalent to the extension portion 86 of the conductive part 85.

The second end portion of the conductive part 85a may be a protrusion 87a protruding from the frame 11 toward the trajectory of the arm 51 so as to come into contact with the arm 51 at an intermediate detection position of the liquid level. In this case, the protrusion 87a may be provided on a rotation groove 26 exposed toward the trajectory of the locking end 51a which is positioned at the base end side of the arm 51 between the first auxiliary stopper surface 27a and the second auxiliary stopper surface 27b.

According to the liquid level detector 1, even if the conductive part 70 or the like is not necessarily provided in the first stopper or the second stopper, it is possible to provide the liquid level detector 1 having a compact outer shape with a simple configuration that is capable of suppressing the generation of sparks around the device 1. In addition, since the protrusion 87 or the like as the second end portion is provided so as to come into contact with the arm 51 at the intermediate detection position of the liquid level, the contact frequency is greater than when it is provided in the first stopper or the like corresponding to the maximum detection position or the minimum detection position of the liquid level. Therefore, it is advantageous that the generation of sparks around the liquid level detector 1 is more easily suppressed.

Second Embodiment

Figure 9:
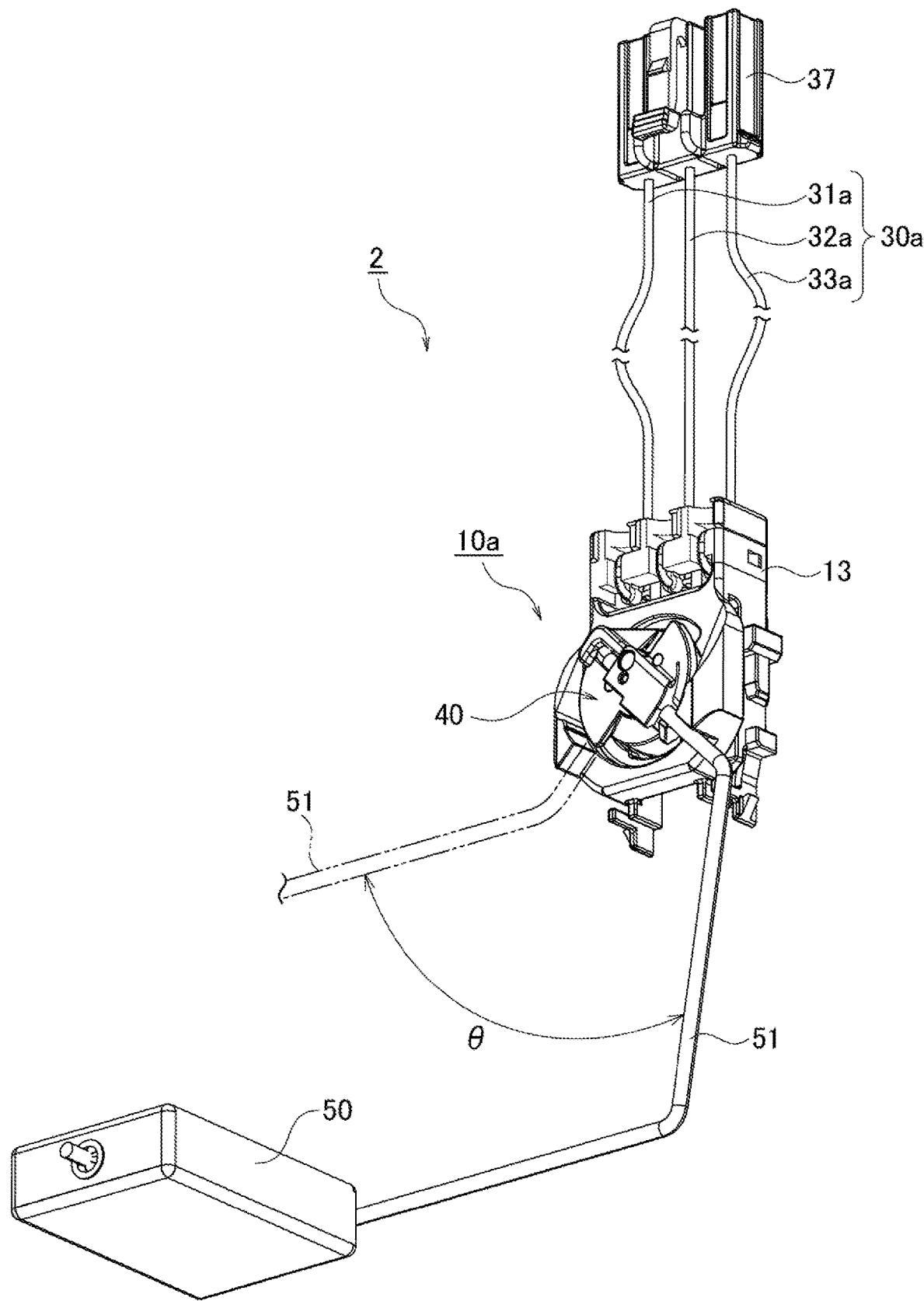
FIG. 9 is a perspective view of a liquid level detector according to a second embodiment.
Figure 10:
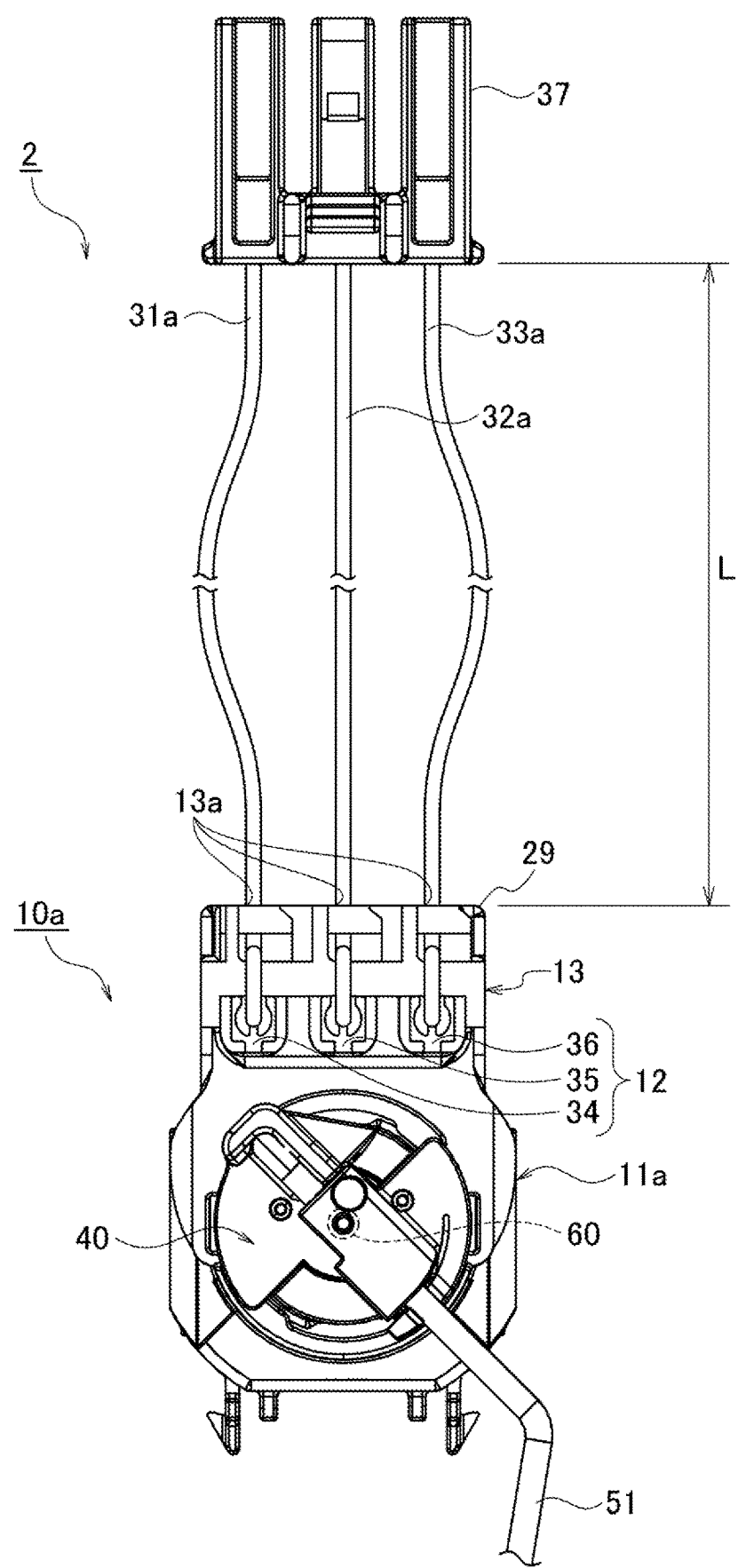
FIG. 10 is a plan view of the liquid level detector according to the second embodiment.

FIG. 9 is a perspective view of a liquid level detector 2 according to a second embodiment. FIG. 10 is a plan view of the liquid level detector 2 excluding the float 50 and a portion of the arm 51. Hereinafter, the term "up-down" in the liquid level detector 2 means an upper side or a lower side in the vertical direction.

The liquid level detector 2 detects the liquid level of liquid (liquid level position), based on the displacement of the arm 51 following the up-down movement of the float 50 floating in the liquid. Hereinafter, as an example, the liquid level detector 2 is mounted in a fuel tank installed in a vehicle such as an automobile, and detects the liquid level of fuel stored in the fuel tank. The liquid level detector 2 includes a device body 10a, lead wires 30a, the connector 37, the holder 40, the float 50, and the arm 51.

The device body 10a is a body part of the liquid level detector 2. The device body 10a includes a frame 11a, the lead frame 12, the holding member 13, and the Hall element 60. Hereinafter, the term "front and rear" in the device body 10a means a front side or a rear side in the horizontal direction. In this case, the front side is the side where the holder 40 is supported in the device body 10a, and the rear side is the side where the lead frame 12 and the like are insert-molded.

The frame 11a is a structure made of resin, for example, and supports the holder 40 rotatably. The frame 11a has the lead wire arrangement part 29 at the upper part thereof. In the lead wire arrangement part 29, a portion of the lead frame 12 which is connected to the lead wires 30a is exposed to the outer side of the frame 11a, and the distal end portions of the lead wires 30a to be connected to the lead frame 12 are arranged.

The lead frame 12 is a conductor part that is partially insert-molded into the frame 11a. The lead frame 12 includes at least three terminals each of which is an independent plate body according to the type of the lead wire 30a which is based on the detection method for the detection part. In the present embodiment, the lead frame 12 includes the input terminal 34, the ground (GND) terminal 35, and the output terminal 36. The input terminal 34, the ground terminal 35, and the output terminal 36 are electrically connected to the Hall element 60 serving as the detection part according to their respective functions. That is, one ends of the lead wires 30a are connected to the device body 10a so as to communicate with the Hall element 60.

The holding member 13 is attached to the lead wire arrangement part 29 provided in the frame 11a to hold the lead wires 30a. For example, the holding member 13 may have the grooves 13a corresponding to the diameters of the lead wires 30a for each lead wire 30a. In the holding member 13, the lead wires 30a are held in the lead wire arrangement part 29 in a state where the lead wires 30a are engaged with the grooves 13a, and thus the lead wires 30a can hardly be detached from the lead frame 12.

The Hall element 60 is a magnetic detection element that detects the rotation angle of the holder 40, and is an example of the detection part that detects the amount of displacement to derive the liquid level of fuel.

At least three lead wires 30a are provided based on the detection method or the like for the detection part, and electrically connect the liquid level detector 2 with an external device such as a measurement instrument. In the present embodiment, the lead wires 30a include an input wire 31a for power sources, a ground (GND) wire 32a, and an output wire 33a for signals, which are independent of each other. One end of the input wire 31a is connected to the input terminal 34 in the lead wire arrangement part 29. One end of the ground wire 32a is connected to the ground terminal 35 in the lead wire arrangement part 29. One end of the output wire 33a is connected to the output terminal 36 in the lead wire arrangement part 29.

Here, in the present embodiment, the lengths of at least three lead wires 30a are not the same as those illustrated in FIG. 10, which will be described in detail below.

The connector 37 connects the other ends of the input wire 31a, the ground wire 32a and the output wire 33a without being in contact with each other, and is connected to the reception connector which is electrically continuous with the external equipment.

The holder 40 is a member made of resin, for example, and holds the base end side of the arm 51, and converts the displacement of the arm 51 following the up-down movement of the float 50 associated with the change of the fuel level, into a rotational movement. The rotation range of the holder 40 is restricted to the angular range θ by a stopper such as the first stopper surface 25a provided on the frame 11. The holder 40 is provided with an annular magnet at the inner side thereof. The magnet is a displacement member used for detecting the rotation angle of the holder 40 by means of the Hall element 60 provided in the frame 11a. The float 50 floats on a liquid fuel. That is, the float 50 moves up and down as the liquid level of the fuel changes in the fuel tank. The arm 51 is a rod-shaped member connecting the holder 40 and the float 50 with each other. The arm 51 supports the float 50 at the distal end side.

Next, the lengths of the lead wires 30a will be described in detail. In the present embodiment, there are three lead wires 30a: the input wire 31a, the ground wire 32a, and the output wire 33a. The arrangement relationship of three lead wires 30a is defined by three grooves 13a provided in the holding member 13. The input wire 31a, the ground wire 32a, and the output wire 33a are arranged with each other in parallel and at equal intervals, in which the parallel direction is a direction perpendicular to both the up-down direction and the front-rear direction with respect to the device body 10a.

Of three lead wires 30a, the lengths of the first lead wires positioned at the respective ends in the parallel direction is longer than the length of the second lead wire positioned so as to be sandwiched between the two other lead wires. In the present embodiment, both the input wire 31a and the output wire 33a correspond to the first lead wire. Meanwhile, the ground wire 32a that is positioned so as to be sandwiched between the input wire 31a and the output wire 33a corresponds to the second lead wire. Therefore, as illustrated in FIG. 10, when the connector 37 is separated from the device body 10a in the upward direction, the ground wire 32a is stretched with a length L, and the input wire 31a and the output wire 33a are loosened.

Figure 11:
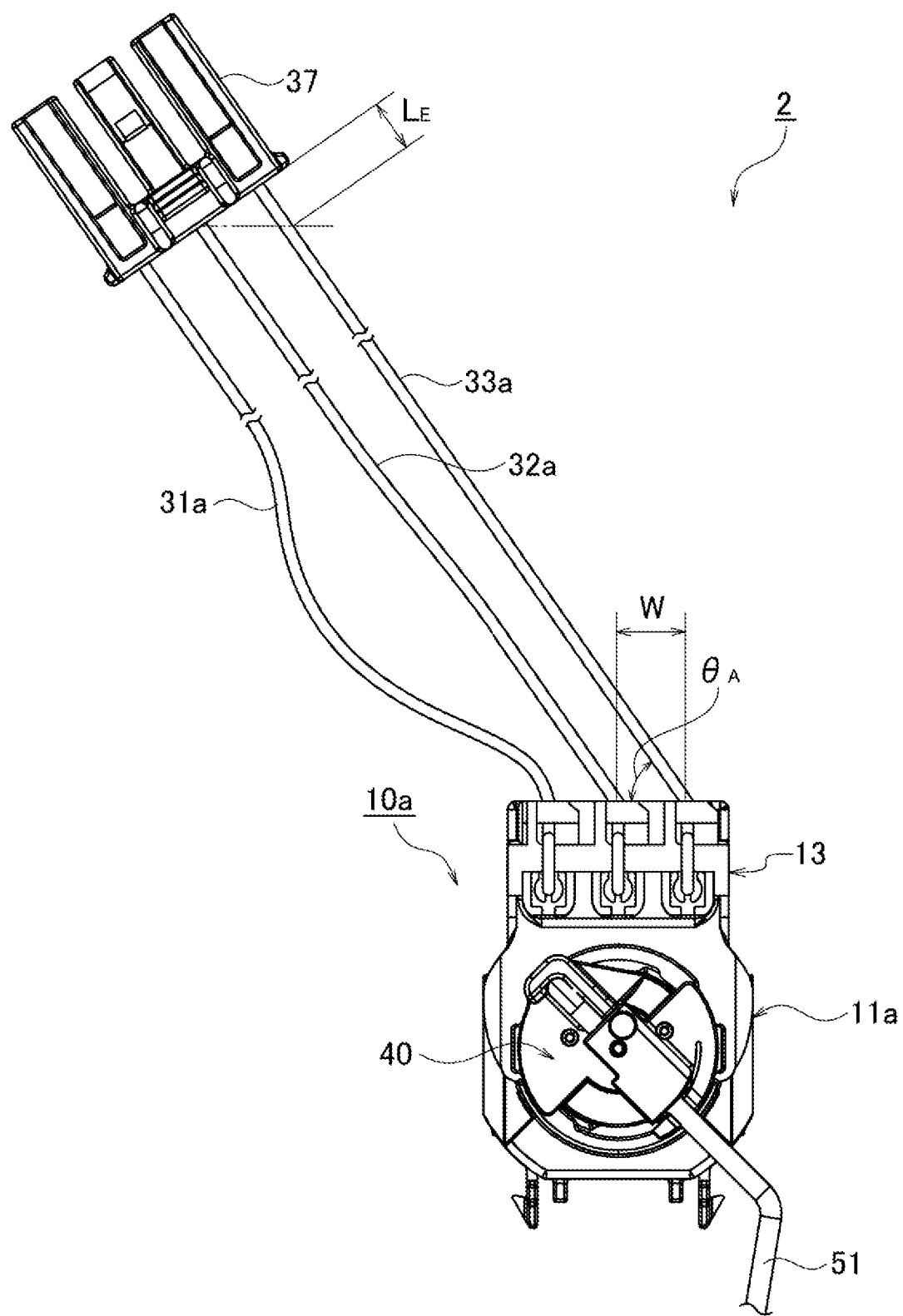
FIG. 11 is a conceptual diagram for explaining how to set the lengths of lead wires.

FIG. 11 is a conceptual diagram for explaining how to set the lengths of the lead wires 30a, which corresponds to FIG. 10. FIG. 11 illustrates a state in which the output wire 33a, which is the first lead wire, is inclined to the ground wire 32a side while the ground wire 32a, which is the second lead wire, is stretched.

Here, the length of the second lead wire, that is, the length of the ground wire 32a is defined as L. The width between the first lead wire positioned at one end in the parallel direction, that is the output wire 33a, and the ground wire 32a positioned next to the output wire 33a, is defined as W. Further, the inclination angle with respect to the parallel direction obtained when the output wire 33a is inclined to the ground wire 32a side is defined as $\theta_A$. In this case, the length of the output wire 33a is longer than the length L of the ground wire 32a by an extension length LE represented by $W \cos \theta_A$, and is represented by $(L+W \cos \theta_A)$. At this time, the inclination angle $\theta_A$ is set to be in the range of $25° < \theta_A < 65°$. Alternatively, the inclination angle $\theta_A$ may be set to 45°.

Although the length of the output wire 33a, which is one of the first lead wires, has been described here, the length of the input wire 31a, which is the other first lead wire, may be similarly configured.

Next, the operation of the liquid level detector 2 will be described.

Figure 12:
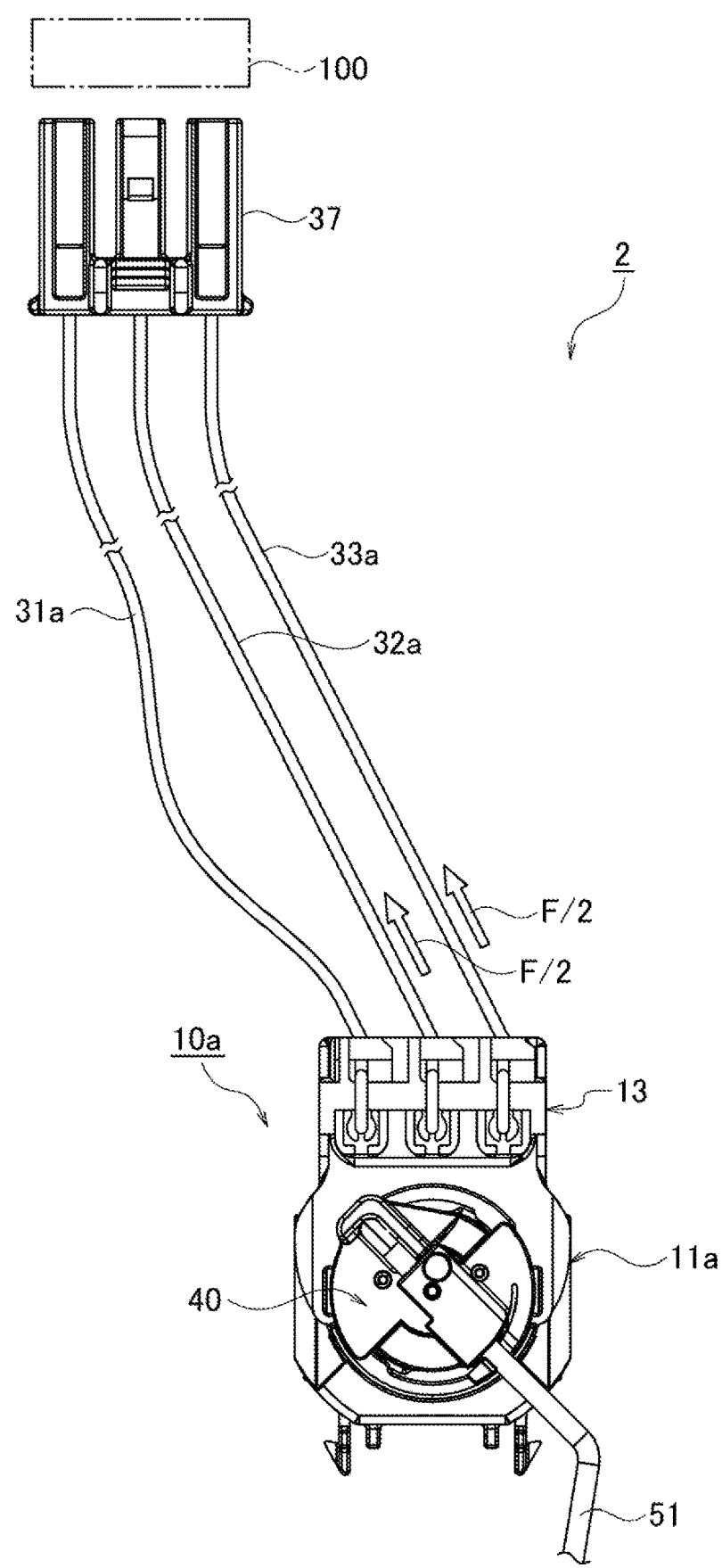
FIG. 12 is a conceptual diagram for explaining a tensile load applied to the lead wires.

FIG. 12 is a conceptual diagram for explaining the tensile load applied to the lead wires 30a, which corresponds to FIG. 10. FIG. 12 illustrates a reception connector 100 that is a fitting target for the connector 37 when the liquid level detector 2 is mounted in the fuel tank, and the reception connector 100 is indicated by double-dashed lines.

For example, when an operator mounts the liquid level detector 2 in the fuel tank, as illustrated in FIG. 12, a case is assumed that the operator connects the connector 37 to the reception connector 100 that is obliquely positioned upward with respect to the position of the device body 10a while holding the connector 37. In particular, the reception connector 100 is provided at a position closer to the input wire 31a side along the parallel direction of the lead wires 30a from directly above the device body 10a.

First, as a comparative example, when assuming that the lengths of all lead wires 30a are the same, in a case where an operator attempts to connect the connector 37 to the reception connector 100, the input wire 31a positioned closer to the reception connector 100 is likely to loosen. However, the output wire 33a positioned farther from the reception connector 100 is likely to be pulled toward the reception connector 100 positioned on the opposite side in the parallel direction. Therefore, a tensile load F that is applied to three lead wires 30a as a whole may be concentrated on the output wire 33a positioned at one end of the lead wires 30a in the parallel direction.

In contrast, in the present embodiment, the length of the output wire 33a positioned at one end of the lead wires 30a in the parallel direction is set to be longer in advance than the length of the ground wire 32a positioned next to the output wire 33a. For this reason, even if the output wire 33a positioned far from the reception connector 100 is pulled toward the reception connector 100, as illustrated in FIG. 12, the degree of pull is approximated in the output wire 33a and the ground wire 32a. Therefore, the tensile load F applied to three lead wires 30a as a whole is distributed between the output wire 33a and the ground wire 32a.

As an example, it is assumed that the tensile strength for each lead wire 30a is 70N. In the above comparative example, since the tensile load F is approximately applied to only the output wire 33a, the tensile strength of the lead wires 30a as a whole is also about 70N. In contrast, in the present embodiment, since the tensile load F is distributed to the output wire 33*a* and the ground wire 32*a*, the tensile strength of the lead wires 30*a* is about 2 times, that is, about 140N.

In the description, an example has been described in which the reception connector 100 is provided at a position closer to the input wire 31*a* side along the parallel direction of the lead wires 30*a* from directly above the device body 10*a*. In contrast, in the present embodiment, the length of the input wire 31*a* provided on the opposite side of the output wire 33*a* along the parallel direction is also set to be longer than the length of the ground wire 32*a*. Therefore, when the reception connector 100 is provided at a position closer to the output wire 33*a* side along the parallel direction of the lead wires 30*a* from directly above the device body 10*a*, the tensile strength of the lead wires 30*a* as a whole is also improved.

The liquid level detector 2 is mounted on the inner wall of the fuel tank such that the rear surface side of the device body 10*a* faces the inner wall surface of the fuel tank. At this time, the operator connects the connector 37 to the reception connector 100 while moving the lead wires 30*a* on the inner wall of the fuel tank. For this reason, since the lead wires 30*a* generally move along the parallel direction when mounting the liquid level detector 2, the length setting of the lead wires 30*a* described above is effective.

Next, the effect of the liquid level detector 2 will be described.

The liquid level detector 2 is provided with the device body 10*a* including the detection part for detecting a displacement amount for deriving the liquid level of liquid. The liquid level detector 2 includes: at least three lead wires 30*a*, one end of which is connected to the device body 10*a* so as to communicate with the detection part at least and arranged in parallel with each other; and the connector 37 connected to the other end of each lead wire 30*a*. Of at least three lead wires 30*a*, the length of the first lead wire positioned at the end in the parallel direction is longer than the length of the second lead wire positioned so as to be sandwiched between the two other lead wires.

In the above example, the detection part corresponds to the Hall element 60. However, the detection system employed by the liquid level detector 2 is not limited to the system utilizing the Hall element 60, and other detection systems may be employed as long as the rotation angle of the holder 40 can be detected in the system. Further, in the above example, the first lead wire corresponds to the input wire 31*a* and the output wire 33*a*, and the second lead wire corresponds to the ground wire 32*a*.

In the liquid level detector 2, of at least three lead wires 30*a*, the length of the first lead wire positioned at the end in the parallel direction is set to be longer than the length of the second lead wire positioned so as to be sandwiched between the two other lead wires. For this reason, according to the liquid level detector 2, even if the lead wires 30*a* are pulled diagonally upward, it is difficult to concentrate the tensile load on the first lead wire positioned at the end in the parallel direction. Therefore, since the tensile load F applied to at least three lead wires 30*a* can be distributed to the plurality of lead wires 30*a* including the first lead wire, the tensile strength of three lead wires 30*a* as a whole can be improved as a result.

As described above, according to the present embodiment, it is possible to provide the liquid level detector 2 for improving the tensile strength of the lead wires 30*a*.

Although the case where three lead wires 30*a* are provided has been described above, four or more lead wires 30*a* may be provided depending on conditions, such as a difference in the detection method for the detection part and an addition of electronic components performing other functions. For example, when four lead wires 30*a* are provided, two second lead wires adjacent to each other are provided.

In the liquid level detector 2, the length of the second lead wire is L, and the width between the first lead wire positioned at one end in the parallel direction and the second lead wire positioned next to the first lead wire is W. Further, when the first lead wire is inclined to the second lead wire side, the inclination angle with respect to the parallel direction is $\theta_A$. At this time, the length of the first lead wire may be represented by $(L+W \cos \theta_A)$, and the inclination angle may be in the range of $25° < \theta_A < 65°$.

According to the liquid level detector 2, the above effect can be achieved in view of the position where the reception connector 100 is provided relative to the position where the device body 10*a* is mounted, in the internal structure of a fuel tank generally mounted in a vehicle such as an automobile.

In the liquid level detector 2, the inclination angle may be 45°.

According to the liquid level detector 2, the above effect can be more reliably achieved in view of the position where the reception connector 100 is provided relative to the position where the device body 10*a* is mounted, in the internal structure of a fuel tank generally mounted in a vehicle such as an automobile.

Third Embodiment

Figure 13:
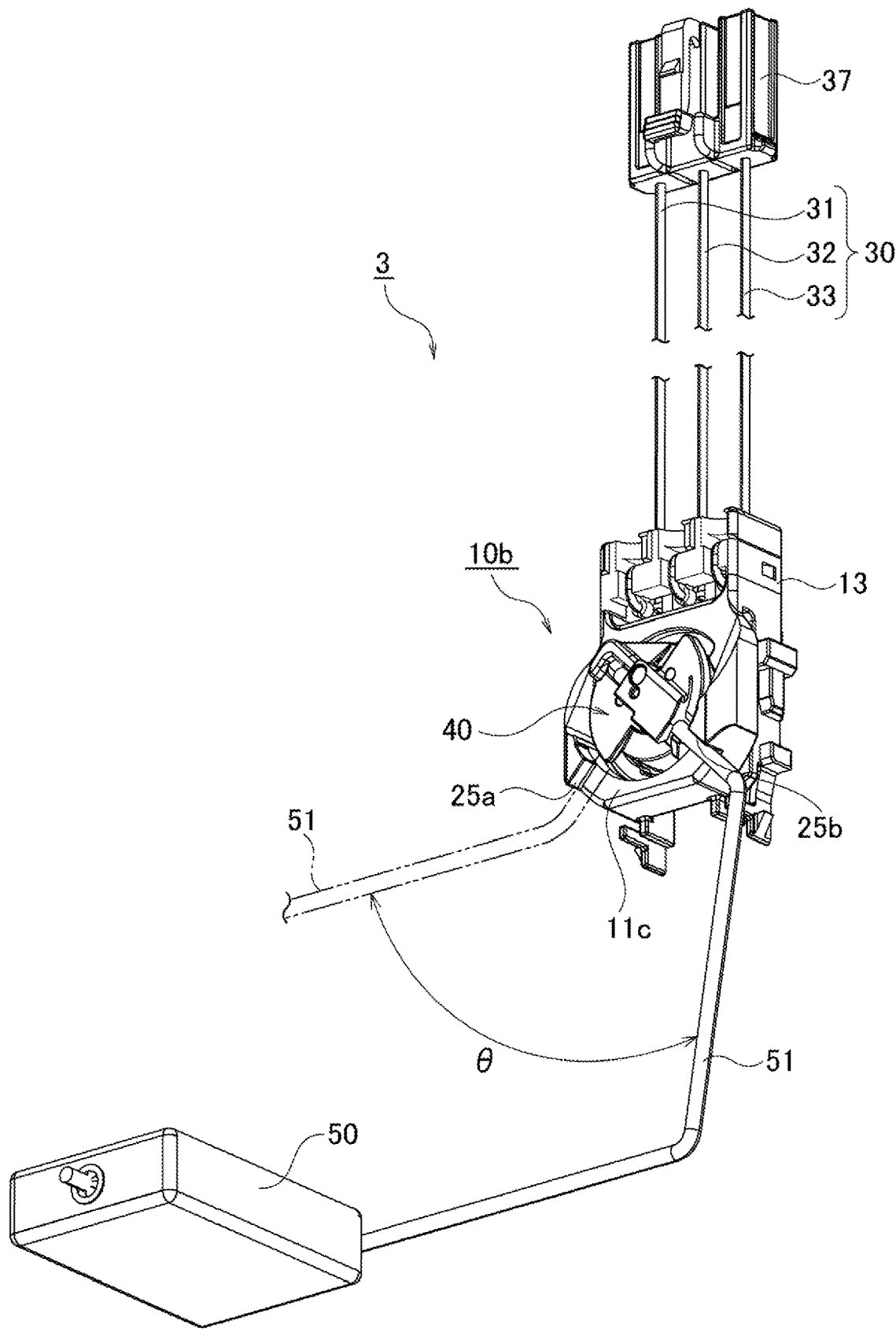
FIG. 13 is a perspective view of a liquid level detector according to a third embodiment.
Figure 14:
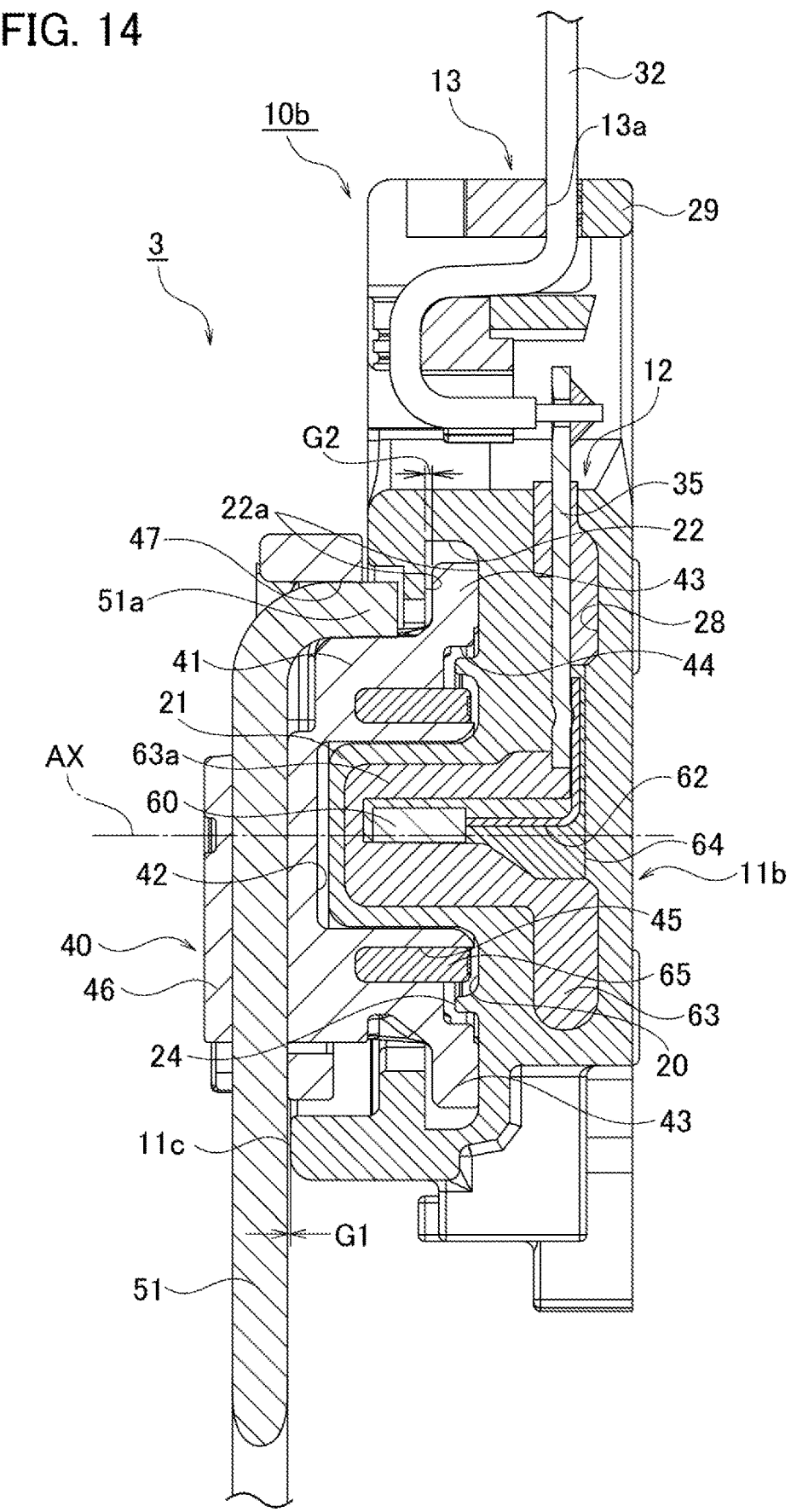
FIG. 14 is a cross-sectional view of a main portion of the liquid level detector according to the third embodiment.

FIG. 13 is a perspective view of a liquid level detector 3 according to a third embodiment. FIG. 14 is a cross-sectional view of a main portion of the liquid level detector 3 which is cut in a plane extending along a vertical direction and includes a central axis AX of the shaft 21. Hereinafter, the term "up and down" in the liquid level detector 3 means an upper side or a lower side in the vertical direction.

The liquid level detector 3 detects the liquid level of liquid (liquid level position), based on the displacement of the arm 51 following the up-down movement of the float 50 floating in the liquid. Hereinafter, as an example, the liquid level detector 3 is mounted in a fuel tank installed in a vehicle such as an automobile, and detects the liquid level of fuel stored in the fuel tank. The liquid level detector 3 includes the device body 10*b*, the lead wires 30, the connector 37, the holder 40, the float 50, and the arm 51.

The device body 10*b* is a body part of the liquid level detector 3. The device body 10*b* includes a frame 11*b*, the lead frame 12, and the holding member 13. Hereinafter, the term "front-rear" in the device body 10*b* means a front side or a rear side in the horizontal direction. In this case, the front side is the side in which the holder 40 is supported in the device body 10*b*, and the rear side is the side in which the lead frame 12 and the like are insert-molded.

The frame 11*b* is a structure made of resin, for example, and supports the holder 40 rotatably. The frame 11*b* has the rotation recess 20, the shaft 21, the locking groove 22, the pair of insertion holes 23, the guide protrusion 24, the first stopper surface 25*a*, the second stopper surface 25*b*, and the arm-facing part 11*c*.

The rotation recess 20 is provided in a circular shape in a plan view at the front side of the frame 11*b*, and rotatably accommodates a portion of the holder 40. The shaft 21 is a rotation reference for the holder 40 coaxially provided at the center of the rotation recess 20, and is engaged with the shaft recess 42 formed in the holder 40.

The locking groove 22 is provided in the inner peripheral portion of the rotation recess 20 in the circumferential direction, and locks the flanges 43 of the holder 40 rotatably. The locking groove 22 has two side walls 22a facing each other in the direction along the central axis AX of the shaft 21. The pair of insertion holes 23 are provided at positions facing each other in the horizontal direction at the edge of the rotation recess 20, and communicate with the locking groove 22. The guide protrusion 24 is provided at the bottom of the rotation recess 20 so as to surround the periphery of the shaft 21, and guides the rotation of the holder 40.

The first stopper surface 25a and the second stopper surface 25b are a pair of stoppers that restrict the arm 51 from oscillating by coming into contact with the arm 51, thereby restricting the rotation of the holder 40. The pair of stoppers are provided at the front side of the frame 11b and below the center of the rotation recess 20, and face each other along the outer periphery of the rotation recess 20 at a distance from each other. When the holder 40 rotates, the arm 51 comes into contact with one of the pair of stoppers at the distal end side from the position facing the shaft 21. As a result, the rotation range of the holder 40 is restricted to an angular range θ. The first stopper surface 25a comes into contact with the arm 51 at the maximum detection position of the liquid level among the liquid levels that can be detected by the liquid level detector 3. That is, the first stopper surface 25a is at the position where the arm 51 comes into contact when the remaining capacity of the fuel in the fuel tank is almost full. The second stopper surface 25b comes into contact with the arm 51 at the minimum detection position of the liquid level among the liquid levels that can be detected by the liquid level detector 3. That is, the second stopper surface 25b is at the position where the arm 51 comes into contact when the remaining capacity of the fuel in the fuel tank is almost empty.

The arm-facing part 11c is a portion of the outer peripheral surface of the frame 11b which is provided at a position facing the trajectory of the arm 51. Here, the trajectory of the arm 51 refers to a region where the arm 51 can be positioned when the arm 51 moves in the angular range θ (moving range of the arm 51), which is the rotation range of the holder 40, as illustrated in FIG. 13. In addition, the position facing the trajectory of the arm 51 refers to a position that can face the trajectory of the arm 51 in the direction along the central axis AX of the shaft 21. In the present embodiment, the arm-facing part 11c corresponds to a plane which is perpendicular to the central axis AX of the shaft 21 and exposed between the first stopper surface 25a and the second stopper surface 25b toward the trajectory of the arm 51. A first space G1 or the like regarding the arm-facing part 11c will be described in detail below.

Further, the frame 11b has the insert molding part 28 and the lead wire arrangement part 29. The insert molding part 28 is a region in which a portion of the lead frame 12, a portion of the Hall element 60, and the like are insert-molded into the frame 11b. In the lead wire arrangement part 29, a portion of the lead frame 12 which is connected to the lead wires 30 is exposed to the outer side of the frame 11b, and the distal end portions of the lead wires 30 to be connected to the lead frame 12 are arranged.

The lead frame 12 is a conductor part that is partially insert-molded into the frame 11b. The lead frame 12 includes a plurality of terminals each of which is an independent plate body according to the type of the lead wire 30 which is based on the detection method for the detection part. In the present embodiment, the lead frame 12 includes an input terminal, the ground (GND) terminal 35, and an output terminal. The lead 62 extending from the Hall element 60 is electrically connected to the input terminal, the ground terminal 35, and the output terminal according to their respective functions. Note that the input terminal and the output terminal are no illustrated.

The holding member 13 is attached to the lead wire arrangement part 29 provided in the frame 11b to hold the lead wires 30. For example, the holding member 13 may have the grooves 13a corresponding to the diameters of the lead wires 30, for each lead wire 30. In the holding member 13, the lead wires 30 are held in the lead wire arrangement part 29 in a state where the lead wires 30 are engaged with the grooves 13a, and thus the lead wires 30 can hardly be detached from the lead frame 12.

In addition, the device body 10b includes the Hall element 60 serving as the detection part for detecting the rotation angle of the holder 40, and the lead 62.

The Hall element 60 is a magnetic detection element that is embedded in the shaft 21 of the frame 11b and generates a Hall voltage proportional to a magnetic flux density passing through the Hall element 60 when a magnetic field is applied from the outside in a state in which a voltage is applied. Meanwhile, a magnet 65 which will be described later is provided at the inner side of the holder 40. When the holder 40 rotates due to a change in the liquid level, the magnet 65 also rotates and is displaced, and an intersection angle between the Hall element 60 and the magnetic flux of the magnet 65 changes, and thus the Hall voltage changes. That is, the rotation angle of the holder 40 can be detected based on the measured Hall voltage, thereby making it possible to detect the liquid level of the fuel. As described above, the lead 62 extends from the Hall element 60 and is electrically connected to the terminals included in the lead frame 12.

In addition, the Hall element 60, the lead 62, and a portion of the lead frame 12 may be mounted at the inner side of the frame 11b by performing insert molding several times For example, the Hall element 60 and the lead 62 may be mounted in the frame 11b together with the resin body 63 by performing insert molding in the first step. Thereafter, the lead frame 12 may be mounted in the frame 11b by performing insert molding in the second step. The resin body 63 has the inner shaft 63a coaxially embedded at the inner side of the shaft 21 of the frame 11b. The Hall element 60 is further provided at the inner side of the inner shaft 63a. The Hall element 60 and the lead 62 may be pre-embedded in the resin body 63, using a resin member 64. Although not illustrated, the resin member 64 may include other electronic components related to the operation of the Hall element 60.

The plurality of lead wires 30 are provided based on the detection method or the like for the detection part, and electrically connect the liquid level detector 3 with an external device such as a measurement instrument. In the present embodiment, the lead wires 30 include the input wire 31 for power sources, the ground (GND) wire 32, and the output wire 33 for signals, which are independent of each other. One end of the input wire 31 is connected to the input terminal in the lead wire arrangement part 29. One end of the ground wire 32 is connected to the ground terminal 35 in the lead wire arrangement part 29. One end of the output wire 33 is connected to the output terminal in the lead wire arrangement part 29.

The connector 37 connects the other ends of the input wire 31, the ground wire 32 and the output wire 33 without being in contact with each other, and is connected to the reception connector which is electrically continuous with the external device.

The holder 40 is a member made of resin, for example, and holds the base end side of the arm 51, and converts the displacement of the arm 51 following the up-down movement of the float 50 associated with the change of the fuel level, into a rotational movement. Hereinafter, the term "front-rear" in the holder 40 means a front side or a rear side in the horizontal direction. At this time, the front side is the side in which the arm 51 is held, and the rear side is the side supported by the device body 10b in the holder 40. The holder 40 has the holder body 41 and the arm holding part 46.

The holder body 41 is a cylindrical member having the shaft recess 42, the pair of flanges 43, and the guide recess 44.

The shaft recess 42 is provided at the rear surface side of the holder body 41 and provided coaxially with the center shaft of the shaft 21, and is rotatably and slidably engaged with the shaft 21, using the shaft 21 provided in the frame 11b as a rotary shaft. In the present embodiment, the center shaft of the shaft recess 42 is referred to as a "rotary shaft" in distinction from a center shaft AX of the shaft 21. Each of the flanges 43 is provided so as to protrude radially outward from the rear edge of the holder body 41. The pair of flanges 43 protrude in respective opposite directions along the extension direction of the arm 51 produced when the arm is held by the arm holding part 46. The guide recess 44 is provided at the rear surface side of the holder body 41 and at the outer peripheral side of the magnet 65 provided in the holder body 41, and accommodates the guide protrusion 24 provided in the frame 11b.

When the holder 40 is attached to the frame 11b, an operator fits the holder 40 into the rotation recess 20 in a state in which the pair of flanges 43 are provided so as to match the position of the pair of insertion holes 23 in the frame 11b. When the flanges 43 pass through the insertion holes 23, the shaft 21 of the frame 11b is inserted into the shaft recess 42 of the holder 40. In addition, the guide protrusion 24 of the frame 11b enters the guide recess 44 of the holder 40. Next, when the operator rotates the holder 40 fitted into the rotation recess 20 such that the locking hole 47 described later is arranged upward, the flanges 43 enter the locking groove 22 of the frame 11b, thereby allowing the holder 40 not to remove from the rotation recess 20. In the state where the holder 40 holds the arm 51, the rotation range of the holder 40 is restricted by the first stopper 25a or the like, thereby preventing the holder 40 removing from the rotation recess 20 due to the movement of the flanges 43 to the position of the insertion holes 23.

The arm holding part 46 holds the arm 51 such that the extension direction of the arm 51 is perpendicular to the rotation axis of the holder 40. The arm holding part 46 has the locking hole 47. The locking hole 47 is provided at a portion of the peripheral edge of the holder body 41 so as to penetrate in the front-rear direction of the holder 40, and locks the locking end 51a positioned at the base end side of the arm 51.

The holder 40 is also provided with the annular magnet 65. The magnet 65 is provided at the inner side of the holder body 41 so as to be arranged at the inner peripheral side of the shaft recess 42, and is a displacement member used for detecting the rotation angle of the holder 40 by means of the Hall element 60. In this case, the Hall element 60 is positioned at the inner diameter side of the magnet 65 which rotates and is displaced, associated with the rotation of the holder 40.

The float 50 floats on a liquid fuel. That is, the float 50 moves up and down as the liquid level of the fuel changes in the fuel tank.

The arm 51 is a rod-shaped member which connects the holder 40 and the float 50 with each other. The arm 51 supports the float 50 at the distal end side. Meanwhile, the arm 51 is held by the arm holding part 46 of the holder 40 at the base end side of the arm 51 opposite to the distal end side. The arm 51 may have one or more bending parts. The end portion at the base end side of the arm 51 is the locking end 51a bent at a right angle. The locking end 51a is inserted into the locking hole 47 when the arm holding part 46 holds the arm 51.

Next, the arm-facing part 11c provided in the frame 11b will be described in detail. The extension direction of the arm 51 is approximately perpendicular to the central axis AX of the shaft 21 under normal circumstances. At this time, a clearance that is a first space G1 is formed between the arm-facing part 11c and the trajectory of the arm 51 in the direction along the central axis AX of the shaft 21. That is, the arm 51 does not come into contact with the arm-facing part 11c under normal circumstances. Here, the term "normal circumstances" refers to the case where no unintended external force is applied to the arm 51 except for the up-down movement of the float 50.

Meanwhile, the flanges 43 of the holder 40 are approximately parallel to the side walls 22a of the locking groove 22 provided in the frame 11b under normal circumstances. At this time, a clearance that is a second space G2 is formed between the side walls 22a of the locking groove 22 and the flanges 43 in the direction along the central axis AX of the shaft 21. The size of this clearance is determined in consideration of dimensional variations at the time of manufacture, temperature changes at the time of use, aging, or the like in advance. As an example, when the liquid level detector 3 is mounted in a fuel tank of a general automobile, the clearance represented by the second space G2 in the present embodiment is about 0.3 mm.

Figure 15:
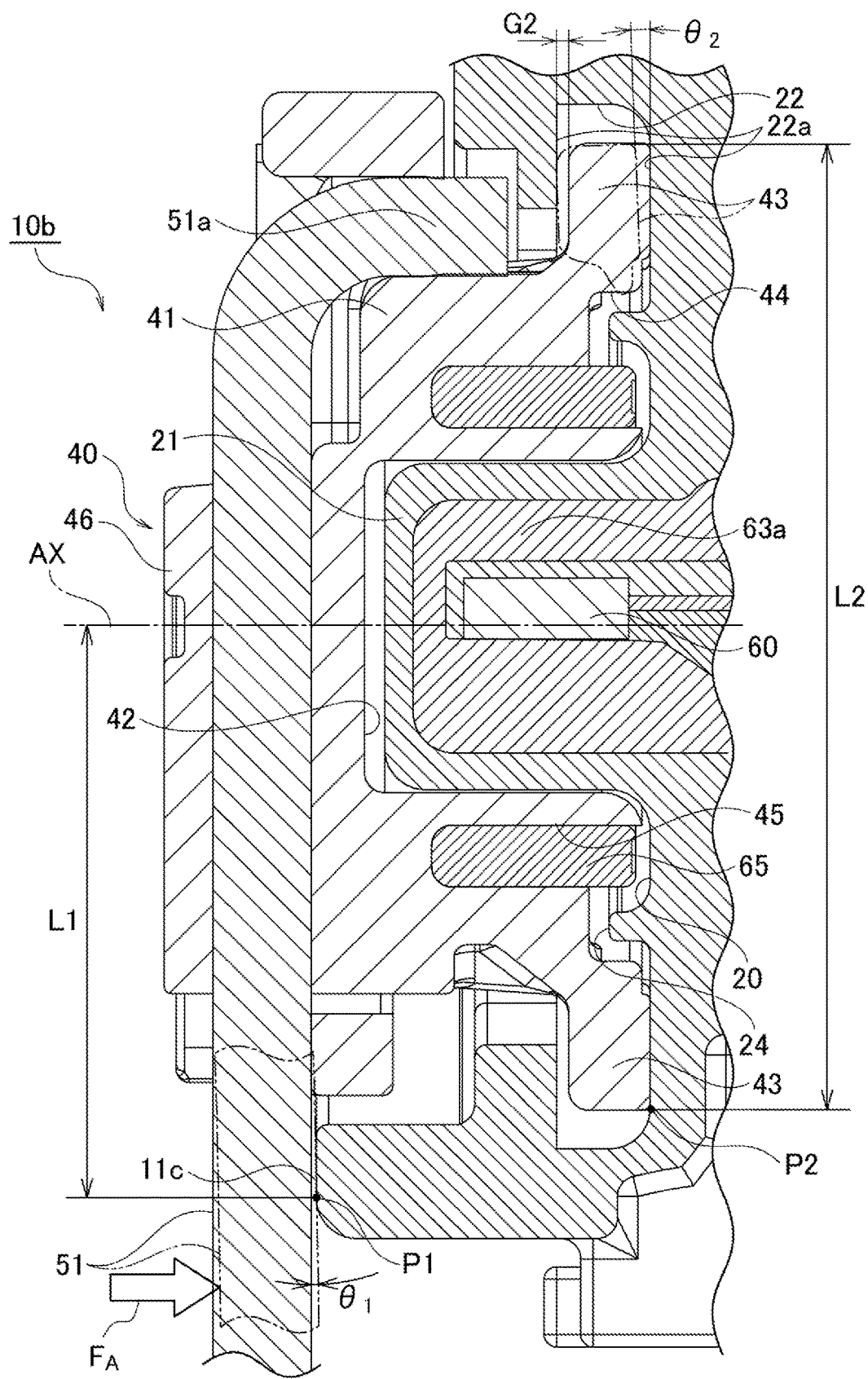
FIG. 15 is an enlarged cross-sectional view for explaining a relationship between a first space and a second space.

FIG. 15 is an enlarged cross-sectional view of the main portion of FIG. 14 for explaining the relationship between the first space G1 and the second space G2. In the present embodiment, the first space G1 related to the clearance between the frame 11b and the arm 51 is smaller than the second space G2 related to the clearance between the frame 11b and the holder 40.

Here, as a first assumption, a case is assumed in which the arm 51 is inclined by receiving an external force $F_A$ in the direction from the outside toward the front side of the liquid level detector 3. In a case where L1 is the distance from the central axis AX of the shaft 21 to a first contact point P1 which comes into contact with the arm-facing part 11c when the arm 51 is inclined, a first maximum angle $\theta_1$ when the arm 51 is inclined by receiving the external force $F_A$ satisfies the relationship of $\tan \theta_1 = G1/L1$.

Meanwhile, when the arm 51 is inclined by receiving the external force $F_A$, the holder 40 that holds the arm 51 is also inclined, that is, the flanges 43 serving as a portion of the holder 40 are also inclined with respect to the side walls 22a of the locking groove 22. Here, as a second assumption, a case is assumed in which the first space G1 is set to be relatively large, and even when the arm 51 is inclined by receiving the external force $F_A$, the arm 51 does not come into contact with the arm-facing part 11c. In this case, one flange 43 comes into contact with one side wall 22a of the locking groove 22 at a second contact point P2, and the holder 40 is inclined at the second contact point P2 as a base point, and thus the other flange 43 comes into contact with the other side wall 22a of the locking groove 22. When the distance from the outermost end of one flange 43 to the outermost end of the other flange 43 is L2, a second maximum angle $\theta_2$ of the holder 40, that is, the second maximum angle $\theta_2$ of the flanges 43 satisfies the relationship of tan $\theta_2$=G2/L2.

Considering the above first and second assumptions, the first maximum angle $\theta_1$ is smaller than the second maximum angle $\theta_2$ in the relationship between the first space G1 and the second space G2 in the present embodiment. For example, when the level detecting device 3 is mounted in a fuel tank of a general automobile, the second maximum angle $\theta_2$ is about 1.5°.

Next, the operation of the level detecting device 3 will be described.

First, in the liquid level detector 3, as a basic operation, the arm 51 oscillates following the up-down movement of the float 50 associated with the change in the liquid level of the fuel, and the holder 40 which is connected to the arm 51 rotates with respect to the device body 10b. The Hall element 60 in the device body 10b detects a change in the magnetic flux of the magnet 65 in the holder 40, and the detection result is transmitted to a measurement unit or the like as an external device through the output wire 33. For example, the measurement unit measures the liquid level on the basis of the output signals transmitted from the liquid level detector 3, and if necessary, warns of fuel exhaustion or the like in the fuel tank.

Meanwhile, when using the liquid level detector 3, an unintended external force $F_A$ is applied to the arm 51 in some cases, as described above in the relationship between the first space G1 and the second space G2. When the arm 51 is inclined by receiving the external force $F_A$, the holder 40 that holds the arm 51 is also inclined. Here, since the Hall element 60 is provided in the shaft 21 of the frame 11b and the magnet 65 is provided in the holder 40, when the holder 40 is inclined with respect to the shaft 21 serving as a rotation reference for the holder 40, the arrangement relationship between the Hall element 60 and the magnet 65 changes. Therefore, when the inclination of the holder 40 increases, the magnetic flux density applied to the Hall element 60 changes in comparison with the normal state, thereby creating a risk of generating an output error.

For example, in the engagement structure between the frame 11b and the holder 40, the holder 40 is held in the frame 11b by engaging the pair of flanges 43 provided in the holder 40 with the locking groove 22 provided in the frame 11b. Therefore, as a comparative example, when the first space G1 is set to be relatively large as illustrated in the second assumption above, the arm 51 does not come into contact with the arm-facing part 11c even if it is inclined by receiving the external force $F_A$. As a result, the holder 40 is inclined such that one flange 43 comes into contact with one side wall 22a of the locking groove 22 at the second contact point P2, and the other flange 43 comes into contact with the other side wall 22a of the locking groove 22. As the output error caused by the inclination posture of the holder 40, it can be considered that the output error that can be generated becomes the maximum when the holder 40 becomes such an inclination posture.

In contrast, in the present embodiment, the position of the arm-facing part 11c is set such that the first space G1 related to the clearance between the frame 11b and the arm 51 is smaller than the second space G2 related to the clearance between the frame 11b and the holder 40. Therefore, when the arm 51 is inclined by receiving the external force $F_A$, the arm 51 comes into contact with the arm-facing part 11c before the inclination posture of the holder 40 in which the output error that can be generated becomes the maximum. In other words, the holder 40 that holds the arm 51 becomes difficult to be inclined to the posture in which the output error that can be generated becomes the maximum, thereby suppressing the output error caused by the inclination posture of the holder 40 as much as possible.

Next, the effect of the liquid level detector 3 will be described below.

The liquid level detector 3 includes the float 50 that floats in liquid, the arm 51 that supports the float 50 at the distal end side, and the holder 40 that holds the base end side of the arm 51 and converts the displacement of the arm 51 following the up-down movement of the float 50 associated with a change in the liquid level of the liquid, into a rotational movement. Further, the liquid level detector 3 includes the frame 11b having the shaft 21 as a rotation reference for the holder 40. In addition, the liquid level detector 3 includes a magnetic detection element that is provided on the shaft 21 and detects the rotation angle of the holder 40, and the magnet 65 that is provided in the holder 40 and applies a magnetic field to the magnetic detection element. The holder 40 has the shaft recess 42 that is rotatably and slidably engaged with the shaft 21, and the arm holding part 46 that holds the arm 51 such that the extension direction of the arm 51 is perpendicular to the central axis of the shaft recess 42. In addition, the holder 40 has the pair of flanges 43 protruding in respective opposite directions along the extension direction of the arm 51 in the arm holding part 46. The frame 11b has the locking groove 22 that includes the two side walls 22a facing each other in the direction along the central axis of the shaft 21 and locks the flanges 43 rotatably, and the arm-facing part 11c that is provided at a position facing the trajectory of the arm 51. The first space G1 between the arm-facing part 11c and the trajectory of the arm 51 is smaller than the second space G2 between the side walls 22a of the locking groove 22 and the flanges 43.

In the above example, the magnetic detection element corresponds to the Hall element 60.

According to the liquid level detector 3, the first space G1 between the arm-facing part 11c and the trajectory of the arm 51 is set smaller than the second space G2 between the side walls 22a of the locking groove 22 and the flanges 43. For this reason, as described above, even when the arm 51 is inclined by the external force $F_A$, the holder 40 comes into contact with the arm-facing part 11c before the inclination posture of the holder 40 in which the output error that can be generated becomes the maximum because of the engagement relationship between the frame 11b and the holder 40. Therefore, the holder 40 that holds the arm 51 becomes difficult to be inclined to the posture in which the output error that can be generated becomes the maximum, thereby making it possible to suppress the output error caused by the inclination posture of the holder 40 as much as possible.

As described above, the present embodiment makes it possible to provide the liquid level detector 3 capable of suppressing the output error.

Further, in the liquid level detector 3, the first space is denoted by G1, and the distance from the central axis AX of the shaft 21 to the first contact point P1 which comes into contact with the arm-facing part 11c when the arm 51 is inclined is denoted by L1. At this time, it is assumed that the first maximum angle $\theta_1$ when the arm 51 is inclined by receiving the external force $F_A$ satisfies the relationship of tan $\theta_1$=GULL. In addition, the second space is denoted by G2, and the distance from the outermost end of one flange 43 to the outermost end of the other flange 43 is denoted by L2. At this time, the second maximum angle $\theta_2$ satisfies the relationship of $\tan \theta_2 = G2/L2$ when assuming that one flange 43 comes into contact with one side wall 22a of the locking groove 22 and the other flange 43 comes into contact with the other side wall 22a of the locking groove 22. In this case, the first maximum angle $\theta_1$ may be smaller than the second maximum angle $\theta_2$.

According to the liquid level detector 3, the first space G1 and the second space G2 can be derived from the relationship between the first maximum angle $\theta_1$ and the second maximum angle $\theta_2$ in consideration of the dimensions of the frame 11b and the holder 40. Therefore, the liquid level detector 3 makes it possible to more reliably achieve the above effect that is capable of suppressing the output error caused by the inclination posture of the holder 40.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

The invention claimed is:

1. A liquid level detector comprising:
a float that floats in liquid;
an arm that supports the float at a distal end side;
a holder that holds a base end side of the arm and converts displacement of the arm following an up-down movement of the float associated with a change in liquid level of the liquid, into a rotational movement;
a frame having a shaft as a rotation reference for the holder;
a detection part that is provided in the frame and detects a rotation angle of the holder;
a ground terminal connected to the detection part;
a first conductive part having a first end portion connected to the ground terminal and a second end portion positioned so as to be contactable with respect to the arm, and that is at least partially embedded in the frame; and
a second conductive part having a first end portion connected to the ground terminal and a second end portion positioned so as to be contactable with respect to the arm, and that is at least partially embedded in the frame,
wherein the frame has a pair of first stoppers that come into contact with the distal end side of the arm from a position facing the shaft, thereby restricting a rotation range of the holder, a first stopper surface and a second stopper surface constituting the pair of first stoppers,
wherein the second end portion of the first conductive part is exposed toward a trajectory of the arm at the first stopper surface and the second end portion of the second conductive part is exposed toward the trajectory of the arm at the second stopper surface.

2. The liquid level detector according to claim 1, wherein the first conductive part is a conductive plate material and the second conductive part is a conductive plate material.

3. The liquid level detector according to claim 1, wherein the first conductive part is a combination of a conductive member including the second end portion of the first conductive part and wiring, and second the conductive part is a combination of a conductive member including the second end portion of the second conductive part and wiring.

4. A liquid level detector comprising:
a float that floats in liquid;
an arm that supports the float at a distal end side;
a holder that holds a base end side of the arm and converts displacement of the arm following an up-down movement of the float associated with a change in liquid level of the liquid, into a rotational movement;
a frame having a shaft as a rotation reference for the holder;
a detection part that is provided in the frame and detects a rotation angle of the holder;
a ground terminal connected to the detection part;
a first conductive part having a first end portion connected to the ground terminal and a second end portion positioned so as to be contactable with respect to the arm, and that is at least partially embedded in the frame; and
a second conductive part having a first end portion connected to the ground terminal and a second end portion positioned so as to be contactable with respect to the arm, and that is at least partially embedded in the frame,
wherein the frame has a pair of first stoppers that come into contact with the distal end side of the arm from a position facing the shaft, thereby restricting a first rotation range of the holder, and a pair of second stoppers that come into contact with the base end side of the arm from a position facing the shaft, thereby restricting a second rotation range of the holder, a first auxiliary stopper surface and a second auxiliary stopper surface constituting the pair of second stoppers,
the second rotation range restricted by the pair of second stoppers is greater than the first rotation range restricted by the pair of first stoppers,
wherein the second end portion of the first conductive part is exposed toward a trajectory of the arm at the first auxiliary stopper surface and the second end portion of the second conductive part is exposed toward the trajectory of the arm at the second auxiliary stopper surface.

5. The liquid level detector according to claim 4, wherein the first conductive part is a conductive plate material and the second conductive part is a conductive plate material.

6. The liquid level detector according to claim 4, wherein the first conductive part is a combination of a conductive member including the second end portion of the first conductive part and wiring, and second the conductive part is a combination of a conductive member including the second end portion of the second conductive part and wiring.

* * * * *